(12) United States Patent  
Tanaka et al.

(10) Patent No.: US 8,731,331 B2  
(45) Date of Patent: May 20, 2014

(54) APPARATUS, SYSTEM, AND METHOD OF COMMUNICATION, AND RECORDING MEDIUM STORING COMMUNICATION CONTROL PROGRAM

(75) Inventors: Kenji Tanaka, Kanagawa (JP); Masaki Nakagawa, Kanagawa (JP); Volmat Alain, Tokyo (JP); Yoshinaga Kato, Kanagawa (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 367 days.

(21) Appl. No.: 13/306,382

(22) Filed: Nov. 29, 2011

(65) Prior Publication Data

US 2012/0140021 A1    Jun. 7, 2012

(30) Foreign Application Priority Data

Nov. 30, 2010  (JP) ................................. 2010-267765  
Aug. 1, 2011   (JP) ................................. 2011-168484

(51) Int. Cl.  
*G06K 9/36*       (2006.01)

(52) U.S. Cl.  
USPC ........................................................ 382/286

(58) Field of Classification Search  
USPC ........................................ 382/286; 348/14.07  
See application file for complete search history.

(56) References Cited

U.S. PATENT DOCUMENTS 6,760,749 B1    7/2004    Dunlap et al.

FOREIGN PATENT DOCUMENTS

JP       2002-325239    11/2002  
JP       2005-18261     1/2005

*Primary Examiner* — Mohammad Islam  
(74) *Attorney, Agent, or Firm* — Oblon, Spivak, McClelland, Maier & Neustadt, L.L.P.

(57) ABSTRACT

In a communication system, a communication terminal displays an image based on display data being displayed and sent by an external apparatus. The communication terminal sends first resolution data specifying a resolution of a display of the communication terminal to the external apparatus. The external apparatus determines a resolution of the display data to be transmitted, based on the first resolution data, and second resolution data specifying a resolution of a display of the external input apparatus. The external apparatus sends the display data, which is converted to have the determined resolution, to the communication terminal.

10 Claims, 24 Drawing Sheets

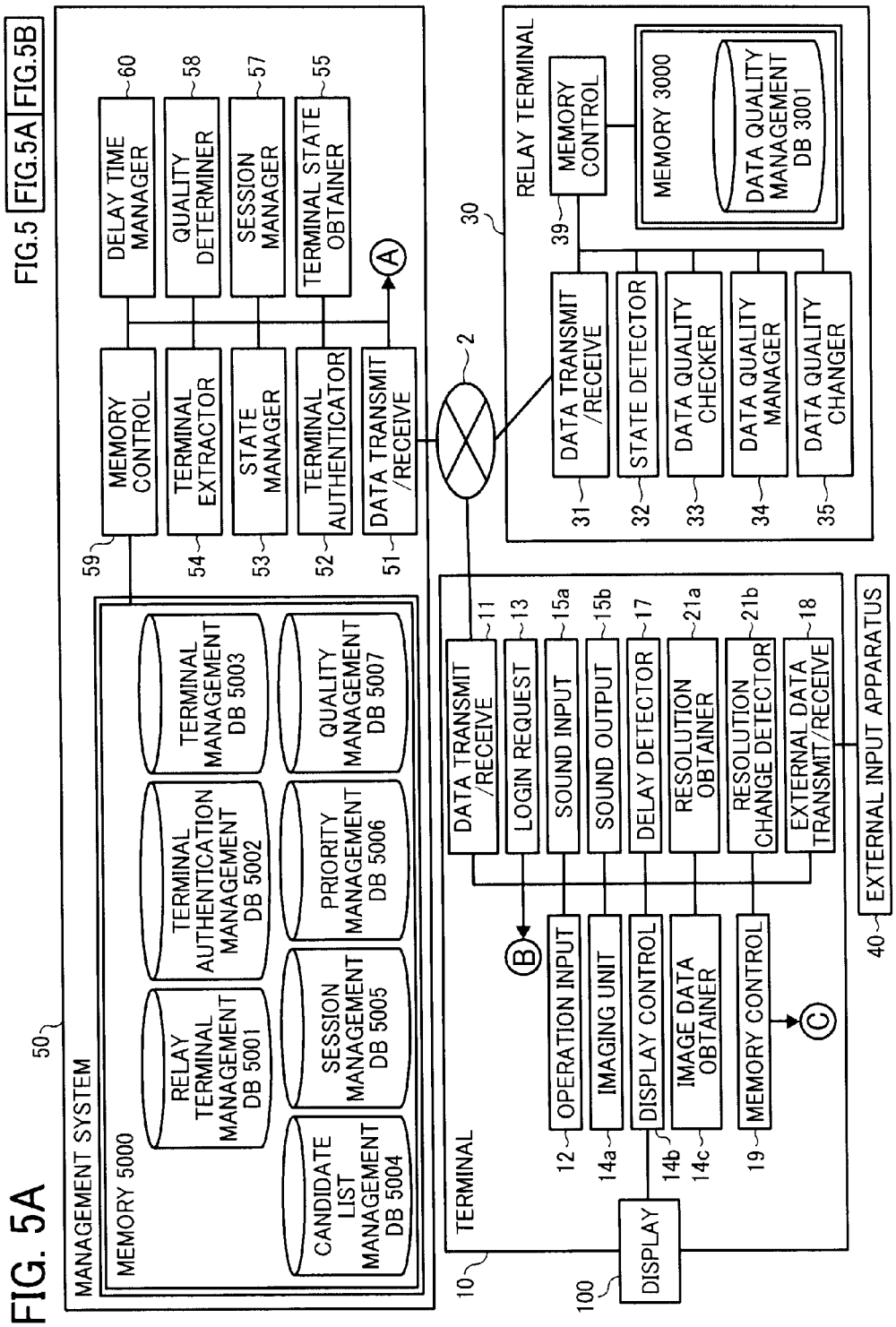

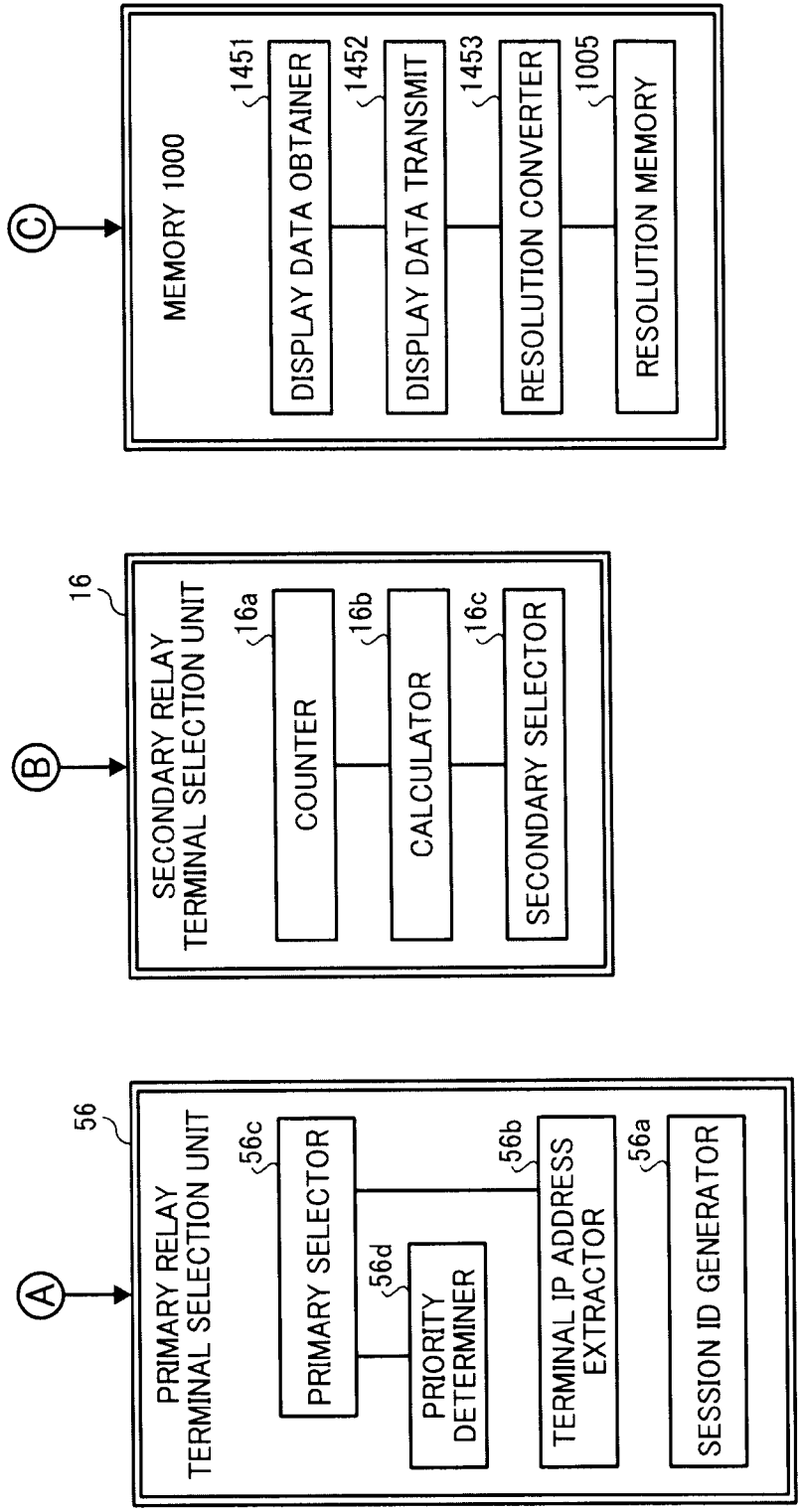

FIG. 7

DATA QUALITY MANAGEMENT TABLE

| TERMINAL IP ADDRESS | IMAGE DATA QUALITY |
|---|---|
| 1.3.2.4 | HIGH |
| 1.3.1.3 | LOW |
| 1.3.4.3 | MEDIUM |
| ... | ... |

FIG. 8

RELAY TERMINAL MANAGEMENT TABLE

| RELAY TERMINAL ID | OPERATION STATE | DATE AND TIME RECEIVED | RELAY TERMINAL IP ADDRESS | MAXIMUM DATA TRANSMISSION SPEED (Mbps) |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.3.2.2 | 10 |

FIG. 9

TERMINAL AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG. 10

TERMINAL MANAGEMENT TABLE

| TERMINAL ID | OPERATION STATE | DATE AND TIME RECEIVED | TERMINAL IP ADDRESS |
|---|---|---|---|
| 01aa | ON-LINE (OK) | 2009.11.10.13:40 | 1.2.1.3 |
| 01ab | OFF-LINE | 2009.11.09.12:00 | 1.2.1.4 |
| ... | ... | ... | ... |
| 01ba | ON-LINE (HOLD) | 2009.11.10.13:45 | 1.2.2.3 |
| 01bb | ON-LINE (OK) | 2009.11.10.13:50 | 1.2.2.4 |
| ... | ... | ... | ... |
| 01ca | OFF-LINE | 2009.11.10.12:45 | 1.3.1.3 |
| 01cb | ON-LINE (COMMUNICATING) | 2009.11.10.13:55 | 1.3.1.4 |
| ... | ... | ... | ... |
| 01da | ON-LINE (COMMUNICATING) | 2009.11.08.12:45 | 1.3.2.3 |
| 01db | ON-LINE | 2009.11.10.12:45 | 1.3.2.4 |
| ... | ... | ... | ... |

FIG. 11

CANDIDATE LIST MANAGEMENT TABLE

| REQUEST TERMINAL ID | COUNTERPART TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG. 12

SESSION MANAGEMENT TABLE

| SESSION ID | RELAY TERMINAL ID | REQUEST TERMINAL ID | COUNTERPART TERMINAL ID | DELAY TIME (ms) | DATE AND TIME RECEIVED |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG. 13

ADDRESS PRIORITY MANAGEMENT TABLE

| DOT ADDRESS SIMILARITY | ADDRESS PRIORITY POINT |
|---|---|
| S. S. S. D | 5 |
| S. S. D. - | 3 |
| S. D. -. - | 1 |
| D. -. -. - | 0 |

FIG. 14

TRANSMISSION SPEED PRIORITY MANAGEMENT TABLE

| MAXIMUM DATA TRANSMISSION SPEED (Mbps) | TRANSMISSION SPEED PRIORITY POINT |
|---|---|
| 1000 ~ | 5 |
| 100 ~ 1000 | 3 |
| 10 ~ 100 | 1 |
| ~ 10 | 0 |

FIG. 15

QUALITY MANAGEMENT TABLE

| DELAY TIME (ms) | IMAGE DATA QUALITY |
|---|---|
| 0 ~ 100 | HIGH |
| 100 ~ 300 | MEDIUM |
| 300 ~ 500 | LOW |
| 500 ~ | (INTERRUPT) |

FIG. 20

| RELAY TERMINAL ID | ADDRESS PRIORITY POINT | | TRANSMISSION SPEED PRIORITY POINT | TOTAL PRIORITY POINT |
|---|---|---|---|---|
| | FIRST ADDRESS PRIORITY POINT FOR REQUEST | SECOND ADDRESS PRIORITY POINT FOR COUNTERPART TERMINAL | | |
| 111a | 5 | 1 | 3 | 8 |
| 111b | 3 | 1 | 5 | 8 |
| 111c | — | — | — | — |
| 111d | 1 | 5 | 1 | 6 |

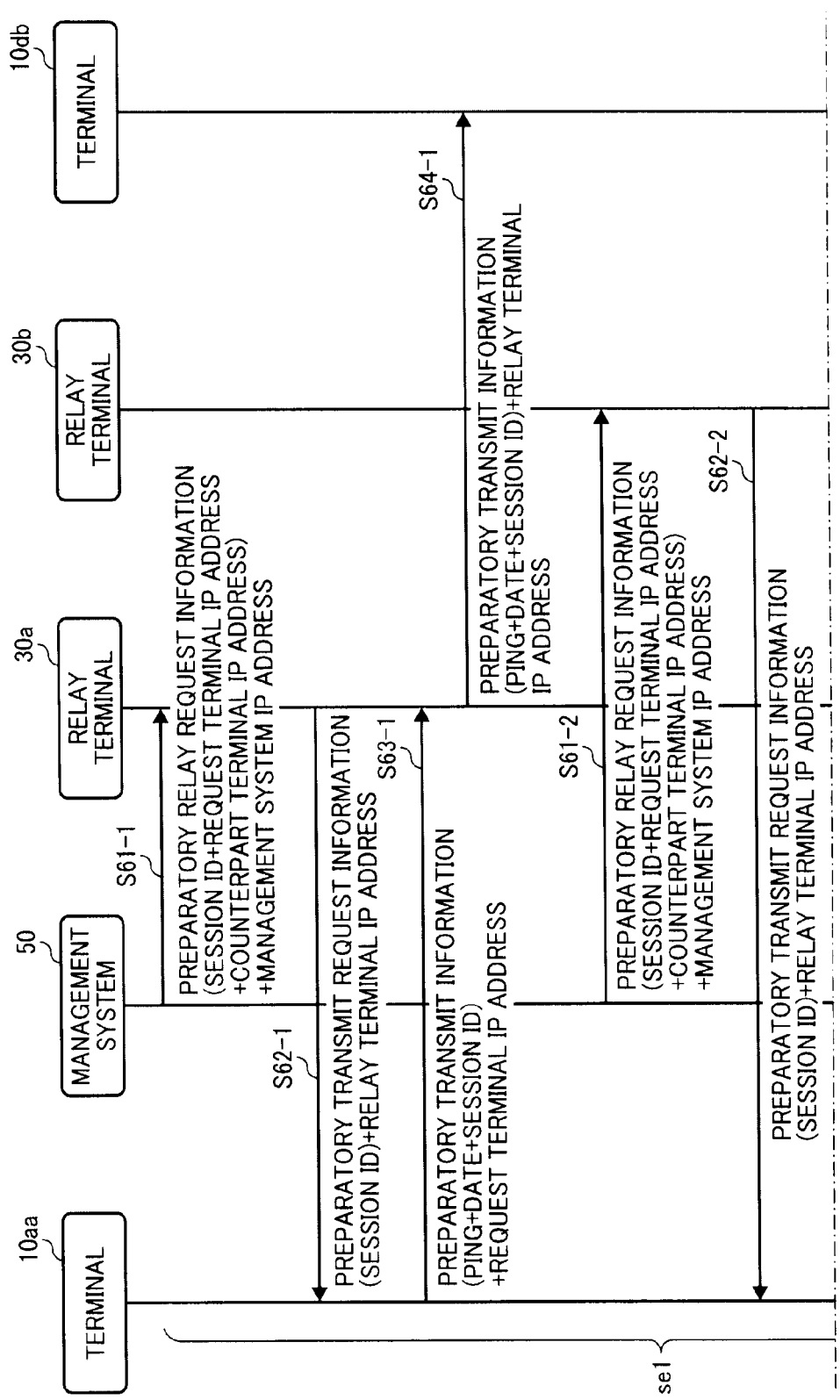

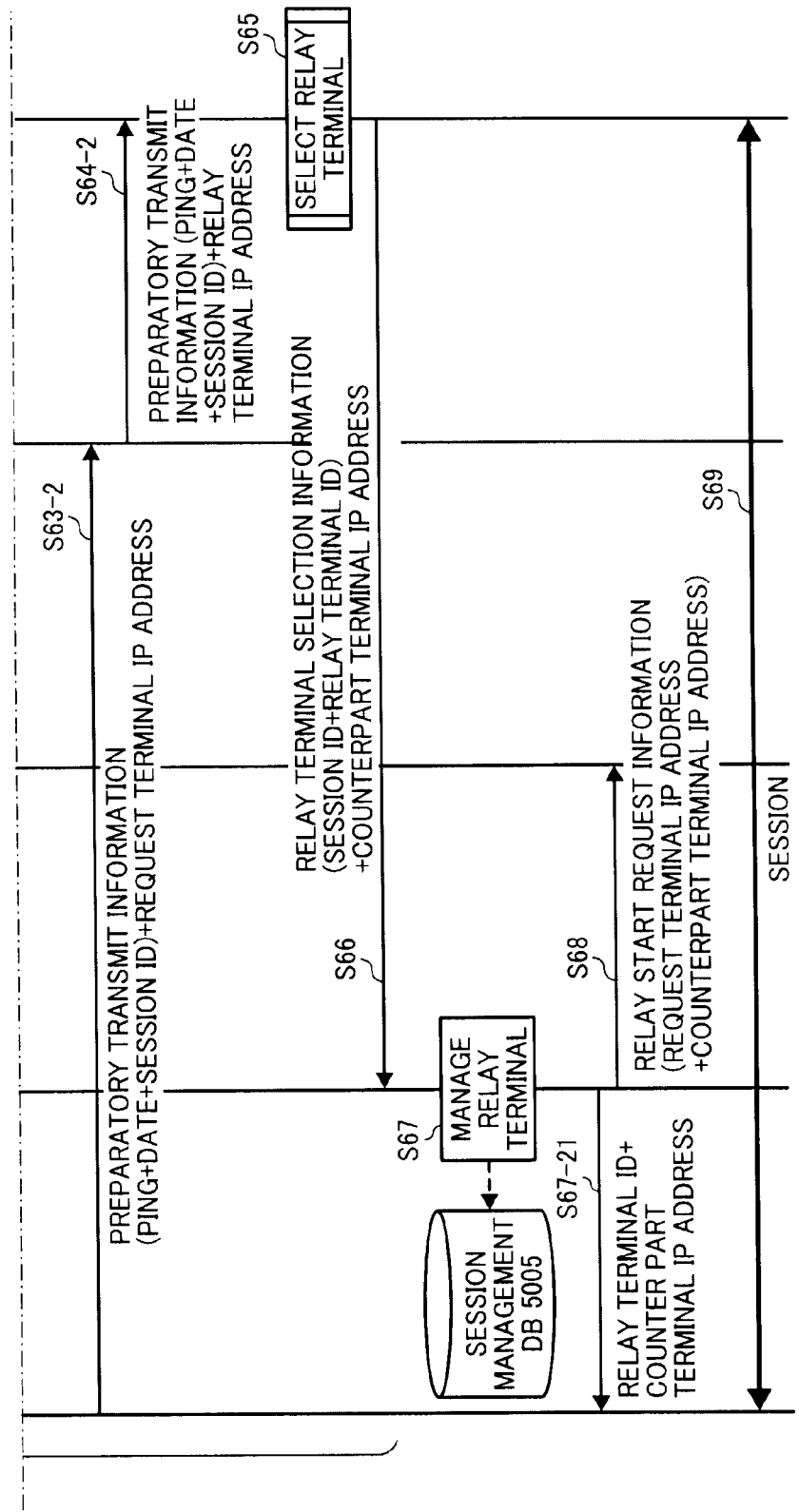

| RESOLUTION (WIDTH) | RESOLUTION (HEIGHT) |
|---|---|
| 1024 | 768 |

IMAGE CAPTURED BY TERMINAL

IMAGE RECEIVED FROM INPUT APPARATUS

APPARATUS, SYSTEM, AND METHOD OF COMMUNICATION, AND RECORDING MEDIUM STORING COMMUNICATION CONTROL PROGRAM

CROSS-REFERENCE TO RELATED APPLICATIONS

This patent application is based on and claims priority pursuant to 35 U.S.C. §119 to Japanese Patent Application Nos. 2010-267765 filed on Nov. 30, 2010, and 2011-168484 filed on Aug. 1, 2011, in the Japan Patent Office, the entire disclosure of which is hereby incorporated herein by reference.

BACKGROUND

1. Field

The present invention generally relates to transmitting data displayed by an external input apparatus that is connected to one communication terminal to another communication terminal through a network.

2. Description of the Background

With the need for reducing costs or times associated with business trips, more companies are moving towards communication systems to have teleconference or videoconference among remotely located offices via a communication network such as the Internet. The communication systems allow transmission of image data and/or voice data of users among a plurality of communication terminals that are remotely located from one another through the communication network to facilitate communication among the plurality of communication terminals.

During videoconference, in addition to the image data and/or voice data of the user, the user at one side may want to share presentation materials with the user at the other side. In such case, as described in U.S. Pat. No. 6,760,749, the communication terminal transmits data of the presentation materials through the communication network to a distribution server. The distribution server sends the received data of the presentation materials to the counterpart terminal. The user at the counterpart terminal is able to see an image, which is displayed based on the data of the presentation materials.

If the presentation materials are displayed by an external apparatus connected to the communication terminal, such external apparatus needs to be registered into the communication systems to be managed by the communication systems such that it has been cumbersome for the user to register the external apparatus every time.

SUMMARY

One aspect of the present invention is to provide a communication terminal, which sends display data that is displayed by a display of an external apparatus connected to the communication terminal to a counterpart communication terminal, in addition to image data of the user. If the resolution of the display of the external input apparatus is higher than the resolution of the display of the communication terminal, the communication terminal lowers the resolution of display data received from the external input apparatus before sending the display data to the counterpart communication terminal. More specifically, the external input apparatus transmits high-resolution data to the communication terminal even though the communication terminal only needs data with lower resolution. This increases the workload of the communication terminal since the terminal needs to convert the display data. This may unnecessarily cause delay in communication as high-resolution data tends to be large in data size.

In view of the above, according to one aspect of the present invention, the communication terminal sends first resolution data specifying a resolution of the display of the communication terminal to the external apparatus. The external apparatus determines a resolution of the display data to be transmitted to the communication terminal, based on the first resolution data and second resolution data specifying a resolution of the display of the external apparatus. The external apparatus sends the display data, which is converted to have the determined resolution, to the communication terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 5A and 5B (FIG. 5) are a schematic block diagram illustrating functional structures of the communication management system, the communication terminal, and the relay terminal, of the communication system of FIG. 1;

FIG. 7 is an example data structure of a data quality management table, managed by the relay terminal of FIG. 5;

FIG. 8 is an example data structure of a relay terminal management table, managed by the communication management system of FIG. 5;

FIG. 9 is an example data structure of a terminal authentication management table, managed by the communication management system of FIG. 5;

FIG. 10 is an example data structure of a terminal management table, managed by the communication management system of FIG. 5;

FIG. 11 is an example data structure of a candidate list management table, managed by the communication management system of FIG. 5;

FIG. 12 is an example data structure of a session management table, managed by the communication management system of FIG. 5;

FIG. 13 is an example data structure of an address priority management table, managed by the communication management system of FIG. 5;

FIG. 14 is an example data structure of a transmission speed priority management table, managed by the communication management system of FIG. 5;

FIG. 15 is an example data structure of a quality management table, managed by the communication management system of FIG. 5;

FIG. 20 is a table storing priority points of the relay terminals that are respectively calculated by the communication management system of FIG. 5 during the operation of limiting a number of candidate relay terminals;

FIGS. 21A and 21B are a data sequence diagram illustrating operation of selecting a relay terminal, performed by the communication system of FIG. 1;

DETAILED DESCRIPTION OF PREFERRED EMBODIMENTS

Figure 1:
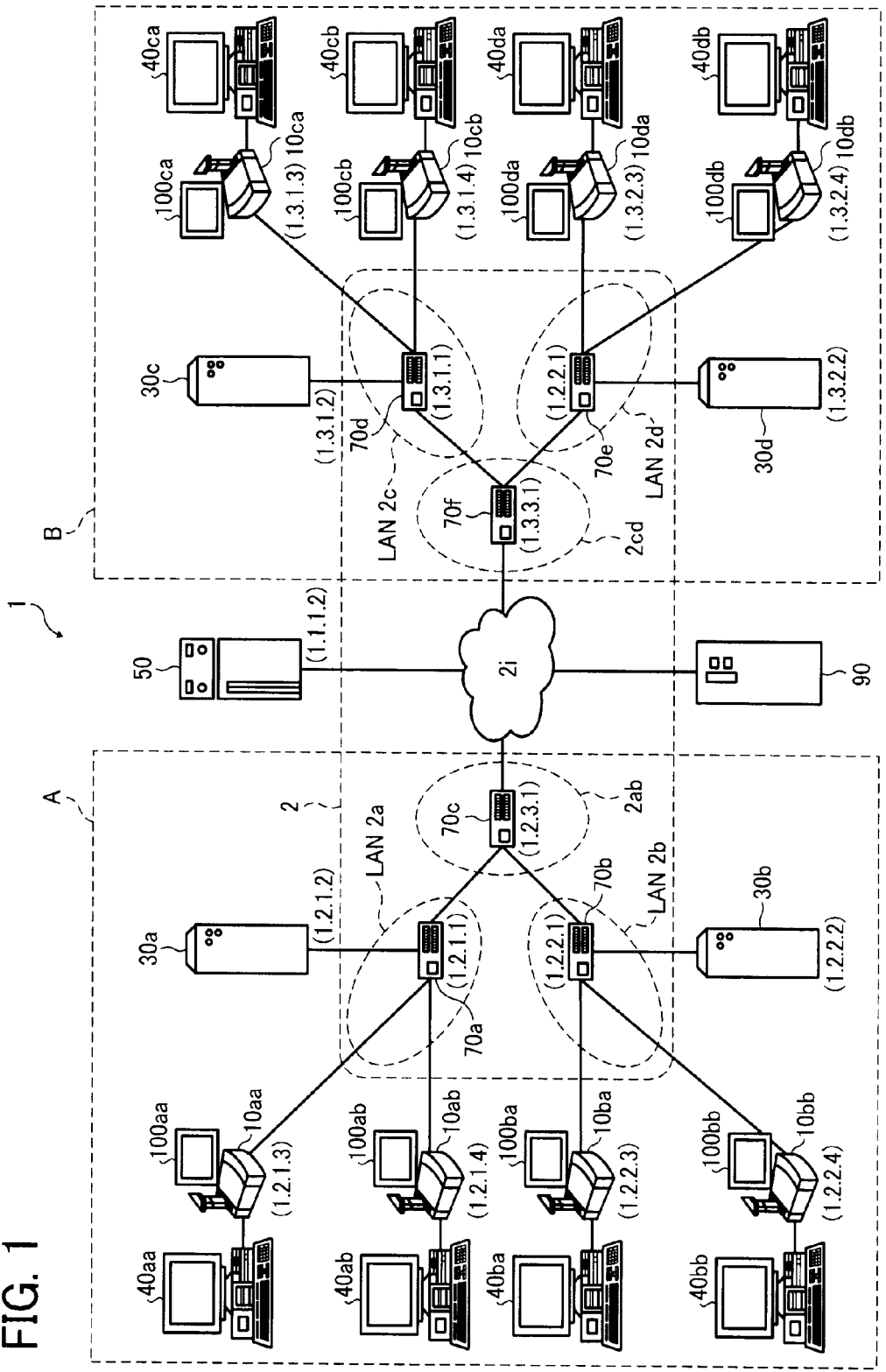
FIG. 1 is a schematic block diagram illustrating a configuration of a communication system, according to an example embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

<Hardware Structure of Communication System>

Referring now to FIGS. 1 to 30, example embodiments of the present invention are explained. FIG. 1 is a schematic block diagram illustrating a communication system 1, according to an example embodiment of the present invention. In this example, the communication system 1 carries out videoconference such as teleconference.

The communication system 1 of FIG. 1 includes a plurality of communication terminals 10aa, 10ab, 10ba, 10bb, 10ca, 10cb, 10da, and 10db, which are respectively provided with a plurality of displays 100aa, 100ab, 100ba, 100bb, 100ca, 100cb, 100da, and 100db, a plurality of relay terminals 30a, 30b, 30c, and 30d, and a communication management system 50.

In this example, the communication terminals 10aa to 10db may be collectively or each referred to as the communication terminal 10 or the terminal 10. The displays 100aa to 100db may be collectively or each referred to as the display 100. The relay terminals 30 to 30d may be collectively or each referred to as the relay terminal 30. Further, the terminal 10 that transmits data to another terminal 10 to carry out videoconference is referred to as the request terminal 10A. The terminal 10 that receives data from another terminal 10 to carry out videoconference is referred to as the counterpart terminal 10B. For example, the request terminal 10A includes any terminal 10 that requests another terminal 10 to start videoconference, and the counterpart terminal 10B includes any terminal 10 that is requested by the request terminal 10A to start videoconference.

The communication terminal 10 transmits or receives data such as image data or voice data to or from the counterpart communication terminal 10. In this example, it is assumed that a moving image is transmitted as the image data. Alternatively, a still image, or both of the still image and the moving image, may be transmitted as the image data. The relay terminal 30 relays data such as image data or voice data between or among the communication terminals 10. The communication management system 50 centrally manages the communication terminals 10 and the relay terminals 30.

The external input apparatus 40, which is connected to the communication terminal 10, sends image data to be displayed ("display data") to the communication terminal 10. The display data is any data that is displayed onto a screen of a display 208a of the external input apparatus 40 such as presentation data. In this example, the presentation data includes any data, which may be used for videoconference and generated using document creation software, spreadsheet software, presentation software, etc. The presentation data, which may be a still image or a moving image, may be obtained by capturing a screen shot image of the display of the input apparatus 40. The captured presentation data may be stored for later use.

The plurality of routers 70a to 70g, which may be collectively or each referred to as the router 70, selects a route that is most suitable for transmitting contents data such as image data and voice data. The program providing system 90 includes a hard disk device (HD) 204 (FIG. 4), which stores a terminal control program that causes the terminal 10 to perform various functions or operations. For example, the program providing system 90 sends the terminal control program to the terminal 10 through the Internet 2i to cause the terminal 10 to install the terminal control program. Further, the HD 204 of the program providing system 90 may store a relay control program that causes the relay terminal 30 to perform various functions or operations. For example, the program providing system 90 sends the relay control program to the relay terminal 30 through the Internet 2*i* to cause the relay terminal 30 to install the relay control program. Further, the HD 204 of the program providing system 90 may store a communication management program that causes the management system 50 to perform various functions or operations. For example, the program providing system 90 sends the communication management program to the management system 50 to cause the management system 50 to install the communication management program.

Still referring to FIG. 1, the terminals 10*aa* and 10*ab*, the relay terminal 30*a*, and the router 70*a* are connected to a local area network (LAN) 2*a*. The terminals 10*ba* and 10*bb*, the relay terminal 30*b*, and the router 70*b* are connected to a LAN 2*b*. The LAN 2*a* and the LAN 2*b* are connected to a leased line 2*ab* in which the router 70*c* is provided. It is assumed that these devices including the terminals 10*aa* to 10*bb* are located in an area A. For example, assuming that the area is any area in Japan, the LAN 2*a* could be located within an office in a city such as Tokyo, and the LAN 2*b* could be located within an office in another city such as Osaka.

The terminals 10*ca* and 10*cb*, the relay terminal 30*c*, and the router 70*f* are connected to a LAN 2*c*. The terminals 10*da* and 10*db*, the relay terminal 30*d*, and the router 70*d* are connected to a LAN 2*d*. The LAN 2*c* and the LAN 2*d* are connected to a leased line 2*cd* in which the router 70*e* is provided. It is assumed that these devices including the terminals 10*ca* to 10*dc* are located in an area B apart from the area A. For example, assuming that the area is any area in the United States, the LAN 2*c* could be located within an office in a city such as New York, and the LAN 2*d* could be located within an office in another city such as Washington, D.C. The area A and the area B are connected through the Internet 2*i*, via the routers 70*c* and 70*e*.

The management system 50 and the program providing system 90 are connected through the Internet 2*i* to the terminal 10 and the relay terminal 30. Any one of the management system 50 and the program providing system 90 may be located at any location within or outside any one of the area A and the area B.

In this example, the communication network 2 includes the LAN 2*a*, LAN 2*b*, leased line 2*ab*, Internet 2*i*, leased line 2*cd*, LAN 2*c*, and LAN 2*d*. Any one or any portion of these lines or any other lines that may be included in the communication network 2 may be implemented as wired network or wireless network such as Wireless Fidelity (WiFi) network or Bluetooth network.

As shown in FIG. 1, the terminal 10, the relay terminal 30, the management system 50, the router 70, and the program providing system 90 are each provided with four digit numbers. These four digit numbers separated by dots are the simple expressions of IP addresses respectively assigned to any one of the devices shown in FIG. 1, each of which has a function of communication device. For example, the IP address of the terminal 10*aa* is "1.2.1.3". For simplicity, it is assumed that the IP address is expressed in IPv4. Alternatively, the IP address may be expressed in IPv6.

<Hardware Structure of Communication System>

Next, a hardware structure of the communication system 1 is explained according to an example embodiment of the present invention. In this example, when any delay in data reception is observed at the counterpart terminal 10B or the relay terminal 30, the relay terminal 30 changes resolution of image data to obtain converted image data and sends the converted image data to the counterpart terminal 10B or the request terminal 10A.

Figure 2:
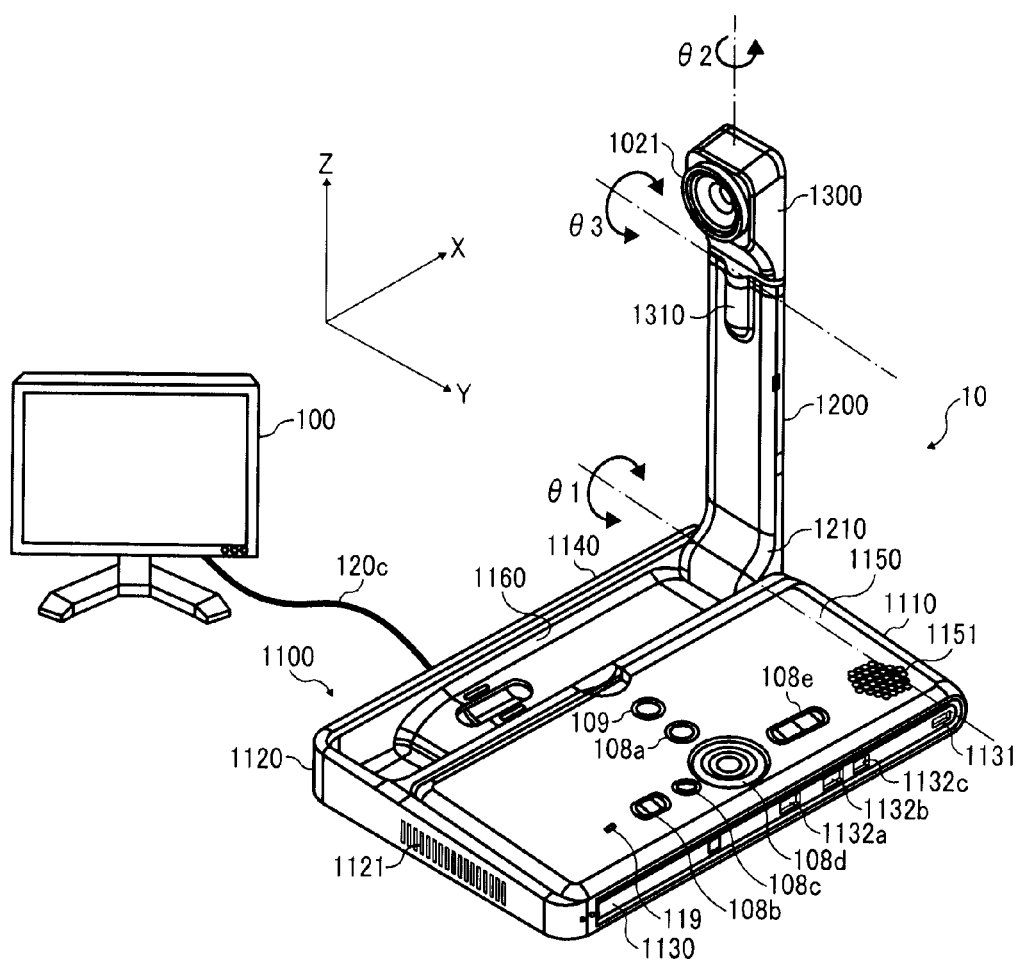
FIG. 2 is a perspective view illustrating the outer appearance of a communication terminal of the communication system of FIG. 1, according to an example embodiment of the present invention.

FIG. 2 is a perspective view illustrating the outer appearance of the terminal 10 of the communication system 1. In FIG. 2, the longitudinal direction of the terminal 10 is referred to as X direction. The direction orthogonal to the X direction, which is the horizontal direction of the terminal 10, is referred to as the Y direction. The direction orthogonal to the X direction and the Y direction is referred to as the Z direction.

As illustrated in FIG. 2, the terminal 10 includes a body 1100, an arm 1200, and a camera housing 1300. The body 1100 includes a back side wall 1110 having a plurality of air intake holes that are formed over the nearly entire surface of the intake surface of the back side wall 1100. The body 1100 further includes a front side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 3) of the terminal 10 is able to catch sounds such as human voice or any sound including noise.

Figure 3:
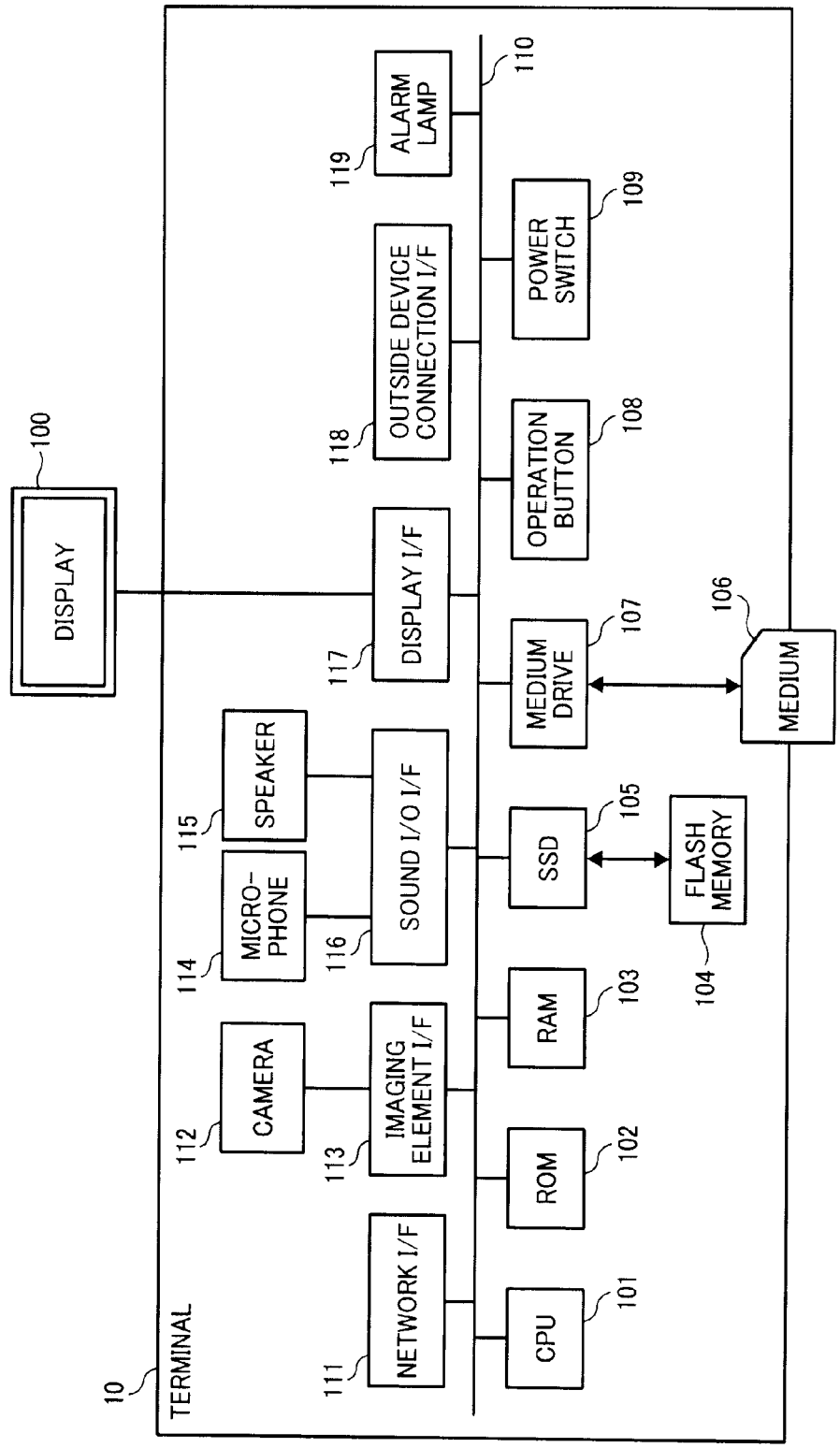
FIG. 3 is a hardware structure of the communication terminal of the communication system of FIG. 1.

The body 1100 has an operation panel 1150, which is provided at a front surface toward the right side wall 1130. The operation panel 1150 includes a plurality of operation buttons 108*a* to 108*e* ("the operation button 108"), a power switch 109, an alarm lamp 119, and a plurality of sound output holes 1151. Through the sound output holes 1151, a speaker 115 (FIG. 3) of the terminal 10 is able to output sounds such as sounds generated based on human voice. The body 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132*a* to 1132*c* ("connection ports 1132"). The connection ports 1132 allow electrical connection to an external device through an external device connection I/F 118 (FIG. 3). The body 1100 further includes a left side wall 1140, which is provided with a connection port to connect the display 100 to a display I/F 117 (FIG. 3) through a cable 120*c* (FIG. 2).

The arm 1200 is fixed to the body 1200 via a torque hinge 1100. With the torque hinge 1200, the arm 1100 can be rotated in directions of up and down with respect to the body, while making a tilt angle θ1 of up to 135 degrees. FIG. 2 illustrates the case where the tilt angle θ1 is 90 degrees.

The camera housing 1300 incorporates therein a camera 112 (FIG. 3) that takes an image of an object. The object may be a part of a user, document, or a room where the terminal 10 is located. The camera housing 1300 is provided with a torque hinge 1310. The camera housing 1300 is fixed to the arm 1200 through the torque hinge 1310. With the torque hinge 1300, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 2, the pan angle θ2 and the tilt angle θ3 are each 0 degree.

The relay terminal 30, the external input apparatus 40, the management system 50, and the program providing system 90 are each implemented by a general-purpose computer such as a personal computer or a server computer. For simplicity, explanation of the outer appearance of the computer is omitted.

FIG. 3 illustrates a hardware structure of the communication terminal 10 of FIG. 1, according to an example embodiment of the present invention. The terminal 10 includes a central processing unit (CPU) 101, a read only memory (ROM) 102, a random access memory (RAM) 103, a flash memory 104, a solid state drive (SSD) 105, a medium drive 107, the operation button 108, the power switch 109, a network interface (I/F) 111, the camera 112, an imaging element interface (I/F) 113, the microphone 114, the speaker 115, a sound input/output interface (I/O I/F) 116, the display interface (I/F) 117, the external device interface (I/F) 118, and an alarm lamp 119, which are electrically connected through a bus 110 such as an address bus or data bus.

The CPU 101 controls entire operation of the terminal 10. The ROM 102 stores therein a control program for execution by the CPU 101, such as an initial program loader (IPL). In this example, the ROM 102 stores the terminal control program. The RAM 103 functions as a work area of the CPU 101. The flash memory 104 stores therein various data such as image data or voice data. The SSD 105 controls reading or writing of various data with respect to the flash memory 104 under control of the CPU 101. The medium drive 107 controls reading or writing of various data with respect to a removable recording medium 106 such as a flash memory.

The operation button 108 allows the user to input a user instruction, for example, by allowing the user to select a communication destination such as the counterpart terminal 10B. The power switch 109 allows the user to switch on or off the power of the terminal 10. The network I/F 111 allows the terminal 10 to transmit data through the communication network 2. The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10. The sound I/O I/F 116 controls input or output of sound signals such as voice signals with respect to the microphone 114 and the speaker 115 under control of the CPU 101. The display I/F 117 transmits image data to the display 100 under control of the CPU 101. The external device I/F 118 transmits or receives various data to or from an external device. The alarm lamp 119 notifies the user of an error detected in the terminal 10.

The recording medium 106, which can be freely attached to or detached from the terminal 10, includes any desired type of recording medium. In alternative to the flash memory 104, any nonvolatile memory that is readable and writable under control of the CUP 101 may be used such as Electrically Erasable and Programmable ROM (EEPROM). The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD). The display 100 may be implemented by a liquid crystal display (LCD) or an organic light emitting display, which displays various data such as an image of an object or an operation icon.

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 4:
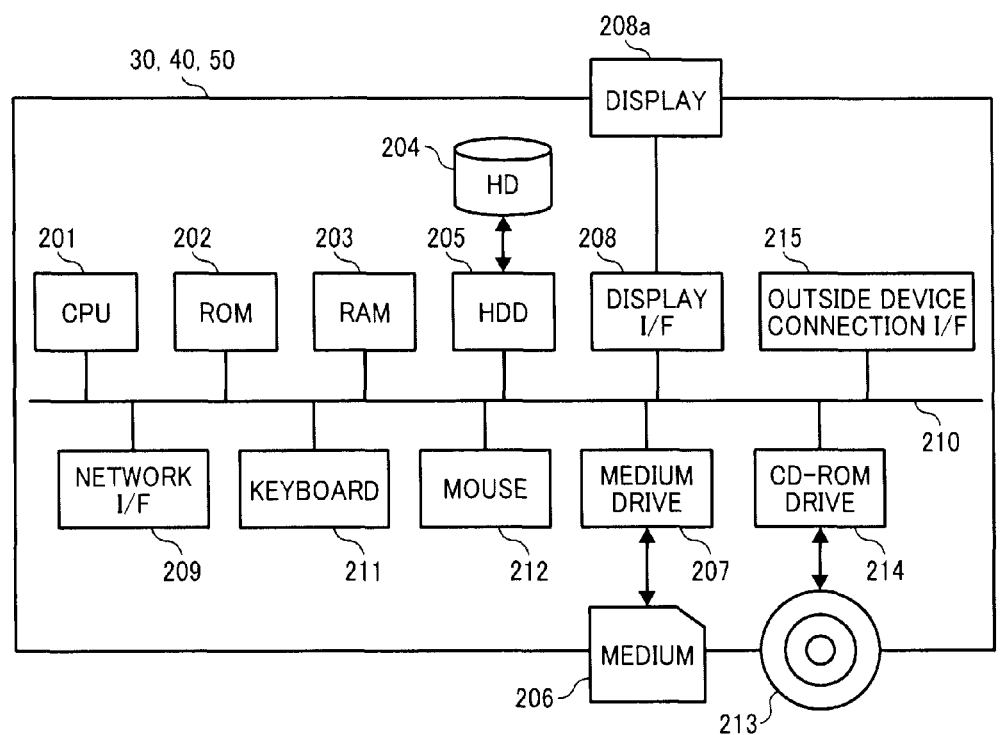
FIG. 4 is a schematic block diagram illustrating a hardware structure of any one of a communication management system, relay terminal, program providing system, and external input apparatus of the communication system of FIG. 1.

FIG. 4 illustrates a hardware structure of the communication management system 50 of FIG. 1. The management system 50 includes a CPU 201, a ROM 202, a RAM 203, the HD 204, a hard disk drive (HDD) 205, a medium drive 207, a display interface (I/F) 208, a network interface (I/F) 209, a keyboard 211, a mouse 212, a CD-ROM drive 214, and an external device interface (I/F) 215, which are electrically connected through a bus 210 such as an address bus or a data bus.

The CPU 201 controls entire operation of the management system 50. The ROM 202 stores a control program for execution by the CPU 201, such as the communication management program. The RAM 203 functions as a work area of the CPU 201. The HD 204 stores therein various data. The HDD 205 controls reading or writing of various data with respect to the HD 204 under control of the CPU 201. The medium drive 207 controls reading or writing of various data with respect to a removable recording medium 206 such as a flash memory. The display I/F 208 displays various data such as a cursor, menu, window, character, or image on a display 208a. The network I/F 209 allows the management system 50 to transmit data through the communication network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used. The external device I/F 215 transmits or receives various data to or from an external device.

The communication management program may be written onto a recording medium that is readable by a general-purpose computer such as the recording medium 206 or the CD-ROM 213 in any format that is installable or executable by the general-purpose computer. Once the communication management program is written onto the recording medium, the recording medium may be distributed. Further, the communication management program may be stored in any desired memory other than the HD 204, such as the ROM 202.

The external input apparatus 40 is substantially similar in hardware structure to the management system 50 of FIG. 4, except for replacement of the communication management program with an input apparatus control program that is used for controlling the external input apparatus 40. The input apparatus control program may be written onto a recording medium that is readable by a general-purpose computer such as the recording medium 206 or the CD-ROM 213 in any format that is installable or executable by the general-purpose computer. Once the input apparatus control program is written onto the recording medium, the recording medium may be distributed. Further, the input apparatus control program may be stored in any desired memory other than the HD 204, such as the ROM 202.

The relay terminal 30 is substantially similar in hardware structure to the management system 50 of FIG. 4, except for replacement of the communication management program with a relay terminal control program that is used for controlling the relay terminal 30. The relay terminal control program may be written onto a recording medium that is readable by a general-purpose computer such as the recording medium 206 or the CD-ROM 213 in any format that is installable or executable by the general-purpose computer. Once the relay terminal control program is written onto the recording medium, the recording medium may be distributed. Further, the relay terminal control program may be stored in any desired memory other than the HD 204, such as the ROM 202.

The program providing system 90 is substantially similar in hardware structure to the management system 50 of FIG. 4, except for replacement of the communication management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

<Functional Structure of Communication System>

Referring now to FIG. 5, a functional structure of the communication system 1 of FIG. 1 is explained according to an example embodiment of the present invention. More specifically, FIG. 5 illustrates a functional structure of the communication terminal 10, the relay terminal 30, and the communication management system 50. As illustrated in FIG. 5, the terminal 10, the relay terminal 30, and the management system 50 exchange data with one another through the communication network 2. In FIG. 5, the program providing system 90 of FIG. 1 is omitted. The external input apparatus 40 is connected to the communication terminal 10 to exchange data with the communication terminal 10.

Figure 6A:
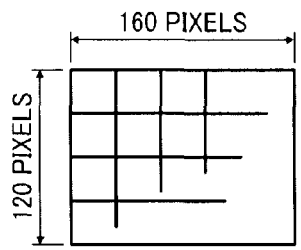
FIGS. 6A to 6C are illustrations for explaining image quality of image data transmitted or received by the communication system of FIG. 1.
Figure 6B:
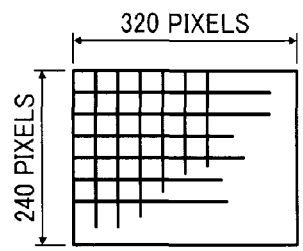
Figure 6C:
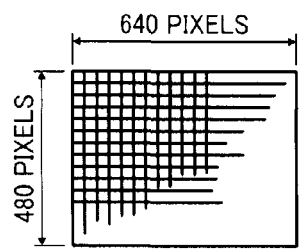
Figures 24, 25:
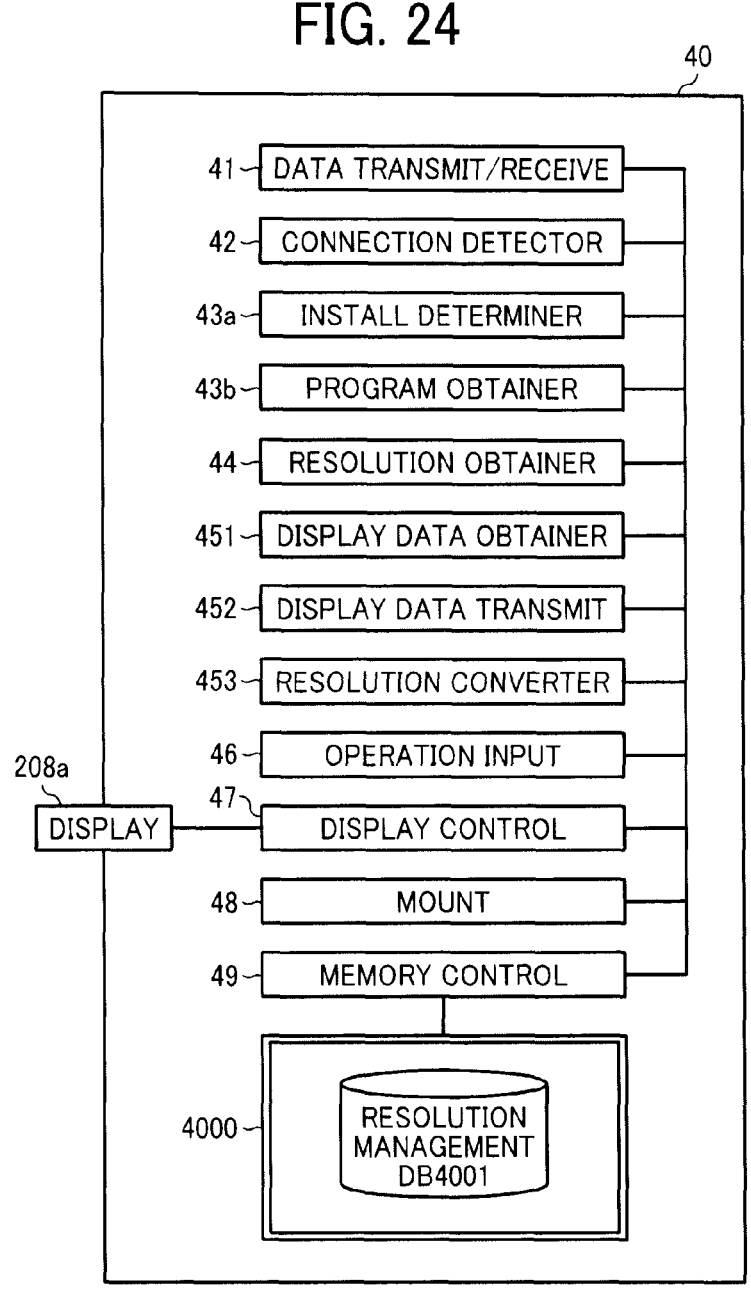
FIG. 24 is a schematic block diagram illustrating a functional structure of the external input apparatus of FIG. 1.
FIG. 25 is an example data structure of a resolution management table, managed by the external input apparatus of FIG. 1.

FIGS. 6A to 6C are illustrations for explaining image quality of image data. FIG. 7 is an example data structure of a data quality management table. FIG. 8 is an example data structure of a relay terminal management table. FIG. 9 is an example data structure of a terminal authentication management table. FIG. 10 is an example data structure of a terminal management table. FIG. 11 is an example data structure of a candidate list management table. FIG. 12 is an example data structure of a session management table. FIG. 13 is an example data structure of an address priority management table. FIG. 14 is an example data structure of a transmission speed priority management table. FIG. 15 is an example data structure of a quality management table. FIG. 24 is a schematic block diagram illustrating a functional structure of the external input apparatus 40 of the communication system 1. FIG. 25 is an example data structure of a resolution management table.

<Functional Structure of Communication Terminal>

The terminal 10 includes a data transmit/receive 11, an operation input 12, a login request 13, an imaging unit 14a, a display control 14b, an image data obtainer 14c, a sound input 15a, a sound output 15b, a secondary relay terminal selection unit 16, a delay detector 17, an external data transmit/receive 18, a memory control 19, a resolution obtainer 21a, and a resolution change detector 21b. These units shown in FIG. 5 correspond to a plurality of functions or functional modules, which are executed according to an instruction of the CPU 101 (FIG. 3) that is generated according to the terminal control program being loaded from the ROM 102 onto the RAM 103. The terminal 10 further includes a memory 1000 that may be implemented by the SSD 105 of FIG. 3.

(Functional Structure of Terminal)

Next, a functional structure of the terminal 10 is explained with reference to FIG. 5. The data transmit/receive 11, which may be implemented by the network I/F 111 (FIG. 3), transmits or receives various data or information to or from another terminal, device, or system, through the communication network 2.

The operation input 12 receives a user instruction input by the user through the operation button 108 or the power switch 109 (FIG. 3). For example, when the user selects "ON" using the power switch 109, the operation input 12 receives a user instruction for turning the power on, and causes the terminal 10 to turn on the power. Further, the operation input 12 receives resolution information indicating a resolution of image data to be output through the display 100, which is set by the user.

The operations or functions of the login request 13 are performed according to an instruction received from the CPU 101. When the power of the terminal 10 is turned on, the login request 13 automatically causes the data transmit/receive 11 to send login request information that requests the login process, and a current IP address of the terminal 10, to the management system 50 through the communication network 2.

The operations or functions of the imaging unit 14a of the terminal 10 of FIG. 5 are performed by the camera 112 and the imaging element I/F 113 according to an instruction received from the CPU 101. The imaging unit 14a generates image data of an image that is obtained by capturing an object. The display control 14b may be implemented by the display I/F 117 (FIG. 3), and renders image data for display onto the display 100. The image data obtainer 14c obtains image data of an image being displayed onto the display 100. The image data of an image being displayed onto the display 100 of the terminal 10, and the image data ("display data") of an image being displayed onto the display 400 of the external input apparatus 40, may be generated in any desired format including, for example, Joint Photographic Experts Group (JPEG), Bitmap, Graphics Device Interface (GDI), etc.

The operations or functions of the sound input 15a of the terminal 10 of FIG. 5 are performed by the sound I/O I/F 116 according to an instruction received from the CPU 101, in cooperation with the microphone 114. After the microphone 114 converts voice of the user at the terminal 10 to a voice signal, the sound input 15a inputs the voice signal in the form of voice data for further processing. The operations or functions of the sound output 15b of the terminal 10 of FIG. 5 are performed by the sound I/O I/F 116 according to an instruction received from the CPU 101, in cooperation with the speaker 115. The sound output 15b outputs a voice signal of voice data that is received from the counterpart terminal 10 through the speaker 115.

The secondary relay terminal selection unit 16 selects one of the relay terminals 30 that is suitable for communication to start videoconference. More specifically, according to an instruction received from the CPU 101 (FIG. 3), the secondary relay terminal selection unit 16 performs selection of the relay terminal 30 using a counter 16a, a calculator 16b, and a secondary selector 16c. The counter 16a obtains date and time information indicating the date and time at which the data transmit/receive 11 of the terminal 10 receives preparatory transmit information when the preparatory transmit information is transmitted from another terminal 10. The calculator 16b calculates a time period T between the time when the preparatory information is transmitted by another terminal 10 and the time when the preparatory information is received at the terminal 10, based on the difference between the time and date information obtained by the counter 16a and time and date information included in the preparatory transmit information The secondary selector 16c selects one of the relay terminals 30 having the minimum value of the time period T calculated by the calculator 16b.

The delay detector 17 detects a delay time ms indicating a time period in which data such as image data or voice data sent through the relay terminal 30 from another terminal 10 is delayed, according to an instruction received from the CPU 101 (FIG. 3). The external data transmit/receive I/F 18 allows transmission or reception of various data between the terminal 10 and an external device, such as the external input apparatus 40, through the external device I/F 215. The memory control 19 is implemented by the SSD 105 (FIG. 3) according to an instruction received from the CPU 101. The memory control 19 stores various data in the memory 1000, or read out various data from the memory 1000.

The resolution obtainer 21a obtains a resolution of the display 100, which is connected to the terminal 10. The resolution change detector 21b detects the change in resolution of the display 100. For example, the resolution of the display 100 may be changed according to a resolution specified by the resolution information received by the operation input 12. In another example, the resolution change detector 21b may detect the change in resolution of the display 100, when a new display 100 is connected to the terminal 10. In this example, the resolution is expressed in number of pixels that can be displayed in each dimension of a screen displayed by the display 100. More specifically, the resolution of the display 100 includes a resolution in vertical direction, and a resolution in horizontal direction. For the descriptive purposes, the resolution of image data being displayed through the display 100 may be referred to as the resolution of the display 100.

The memory 1000 stores therein various data such as terminal identification (ID) information for identifying the terminal 10, a password for authenticating a user at the terminal 10, image data, voice data, and relay terminal identification (ID) information for identifying the relay terminal 30. The memory 1000 may further store an IP address of the counterpart terminal 10. The memory 1000 stores therein various modules or programs to be operated on the external input apparatus 40 when they are sent to the external input apparatus 40. These modules or programs include a display data obtainer 1451, a display data transmit 1452, and a resolution converter 1453.

The display data obtainer program 1451 causes the external input apparatus 40 to have a display data obtainer 451 (FIG. 24). The display data obtainer 451 obtains display data, which is displayed onto the display 208a of the external input apparatus 40. The display data transmit program 1452 causes the external input apparatus 40 to have a display data transmit 452 (FIG. 24) that transmits the display data obtained by the display data obtainer 451 to the communication terminal 10. In this example, the display data includes image data in Joint Photographic Experts Group (JPEG) or Bitmap format, which is converted from the image data that is displayed onto a screen of the display 208a of the external input apparatus 40. Alternatively or additionally, the display data may include a drawing command in Graphics Device Interface (GDI) format of such image data.

The resolution converter program 1453 causes the external input apparatus 40 to have a resolution converter 453 (FIG. 24). The resolution converter 453 determines a resolution of the display data to be transmitted to the terminal 10, based on the resolution of the display 208a of the external input apparatus 40 and the resolution of the display 100 of the communication terminal 10 that is stored in the resolution management DB 4001 of the external input apparatus 40. The resolution converter 453 converts the resolution of the display data that is displayed onto the display 208a to a resolution determined based on information regarding the resolution of the display of the external input apparatus 40 and the resolution of the display of the terminal 10.

The memory 1000 includes a resolution memory 1005, which stores therein information indicating the resolution of the display 100 of the communication terminal 10. In this example, it is assumed that the resolution of the display 100 is the same for the communication terminals 10.

In this example, any one of the terminal ID of the terminal 10 and the relay terminal ID of the relay terminal 30 includes any type of identification information that can be expressed by any language, character, symbol, mark, or any combination of language, character, symbol, and mark.

<Functional Structure of External Input Apparatus>

Referring to FIG. 24, the external input apparatus 40 includes a data transmit/receive 41, a connection detector 42, an install determiner 43a, a program obtainer 43b, a resolution obtainer 44, an operation input 46, a display control 47, a mount 48, and a memory control 49. These units shown in FIG. 24 correspond to a plurality of functions or functional modules, which are executed according to an instruction of the CPU 201 (FIG. 4) that is generated according to the input apparatus control program being loaded from the ROM 202 onto the RAM 203. Further, the program obtainer 43b downloads various modules such as the display data obtainer 1451, the display data transmit 1452, and the resolution converter 1454, from the memory 1000 of the communication terminal 10, for installation onto the external input apparatus 40. When installed, the external input apparatus 40 has the display data obtainer 451, the display data transmit 452, and the resolution converter 453.

The external input apparatus 40 further includes a memory 4000 that may be implemented by any one of the ROM 202, RAM 203, and HDD 205 of FIG. 4. The external input apparatus 40 is installed with an operating system (OS) such as the Windows system. Upon connection with another device or apparatus, the program is automatically executed.

Next, a functional structure of the external input apparatus 40 is explained. The data transmit/receive 41 of the external input apparatus 40, which is implemented by the network I/F 209 of FIG. 4, transmits or receives various data to or from the communication terminal 10. The connection detector 42 detects whether the external input apparatus 40 is capable of transmitting or receiving various data to or from an external apparatus, such as the communication terminal 10, through the external device I/F 215. The install determiner 43a determines whether the external input apparatus 40 is installed with the display data obtainer program 1451, display data transmit program 1452, and resolution converter program 1453, when the connection detector 42 detects that the external input apparatus 40 is communicable with the terminal 10.

The program obtainer 43b obtains various programs from the memory 1000 of the communication terminal 10 through the data transmit/receive 41. For example, when the install determiner 43a determines that the external input apparatus 40 is not installed with the display data obtainer 451, display data transmit 452, and/or resolution converter 453, the program obtainer 44 obtains any one of the programs that is not installed from the memory 1000 of the terminal 10.

The resolution obtainer 44 obtains information regarding a resolution of the display 208a of the external input apparatus 40. The operation input 46 allows the user to input various instructions. The display control 47 causes the display 208a to display various image data, which is read out by the memory control 49.

The mount 48 mounts the memory 1000 to install the display data obtainer program 1451, display data transmit program 1452, and resolution obtain program 1453 onto the external input apparatus 40 to cause the external input apparatus 40 to operate according to these programs.

As described above, the display data obtainer 451 obtains display data, which is displayed onto the display 208a of the external input apparatus 40. The display data transmit 452 transmits the display data obtained by the display data obtainer 451 to the communication terminal 10. The resolution converter 453 converts the resolution of the display data that is displayed onto the display 208a to a resolution determined based on information regarding the resolution of the display 208a of the external input apparatus 40 and the resolution of the display 100 of the terminal 10.

The memory control 49, which is implemented by the HDD 205 of FIG. 4, writes various data to the memory 4000 or reads various data from the memory 400. The external input apparatus 40 is provided with the display 208a of FIG. 4, which displays various data under control of the display control 47. In this example, the data transmit/receive 41 performs the functions of receiving resolution information, and transmitting display data.

(Resolution Management Table)

The memory 4000 further includes a resolution management DB 4001, which stores a resolution management table of FIG. 25. The resolution management table stores the horizontal resolution and the vertical resolution of the display 100 of the communication terminal 10 in an associated manner, which is obtained by the data transmit/receive 41. For example, the resolution management table of FIG. 25 indicates that the horizontal resolution and the vertical resolution of the display 100 of the communication terminal 10 are 1024 pixels and 768 pixels, respectively.

<Functional Structure of Relay Terminal>

Still referring to FIG. 5, a functional structure of the relay terminal 30 is explained according to an example embodiment of the present invention. The relay terminal 30 includes a data transmit/receive 31, a state detector 32, a data quality checker 33, a data quality manager 34, a data quality changer 35, and a memory control 39. These units shown in FIG. 5 correspond to a plurality of functions or functional modules, which are executed according to an instruction of the CPU 201 (FIG. 4) that is generated according to the relay terminal control program being loaded from the ROM 202 onto the RAM 203. The terminal 30 further includes a memory 3000 that may be implemented by any one of the ROM 202, RAM 203, and HDD 205 of FIG. 4.

(Data Quality Management Table)

The memory 3000 includes a data quality management database (DB) 3001, which stores a data quality management table illustrated in FIG. 7. The data quality management table of FIG. 7 stores an Internet protocol (IP) address of the counterpart terminal 10B to which image data is transmitted through the relay terminal 30, in association with quality of image data to be transmitted through the relay terminal 30 to the counterpart terminal 10B.

Referring now to FIGS. 6A to 6C, various image data having different resolution levels, which are respectively transmitted by the terminal 10 of the communication system 1, are explained. Referring to FIG. 6A, the low-level resolution image data, which functions as a base image, has 160 pixels in the horizontal direction and 120 pixels in the vertical direction. Referring to FIG. 6B, the medium-level resolution image data has 320 pixels in the horizontal direction and 240 pixels in the vertical direction. Referring to FIG. 6C, the high-level resolution image data has 640 pixels in the horizontal direction and 480 pixels in the vertical direction. In case of communicating with a narrowband signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with voice data. For example, the data quality management table of FIG. 7 indicates that, in case of relaying image data to the counterpart terminal 10 having the IP address of "1.3.2.4", the quality of the image data to be relayed is high image quality.

<Functional Structure of Relay Terminal>

Next, a functional structure of the relay terminal 30 is explained according to an example embodiment of the present invention. More specifically, in this example, the operations or functions that are performed by the relay terminal 30, which include the operations or functions performed by the units shown in FIG. 5, are performed in relation to one or more hardware devices of the relay terminal 30 that are shown in FIG. 4.

The network I/F 209 of FIG. 4 according to an instruction received from the CPU 201 implements the data transmit/receive 31 of FIG. 5. The data transmit/receive 31 transmits or receives various data or information to or from another terminal, device, or system through the communication network 2.

The state detector 32, which is implemented by the CPU 201 of FIG. 4, detects an operation state of the relay terminal 30. For example, the operation state includes the on-line state ("ON LINE"), the off-line state ("OFF LINE"), the communicating state, the holding state, and the error state. The on-line state is a state in which the relay terminal 30 is turned on and available for data transmission/reception. The off-line state is a state in which the relay terminal 30 is not available for data transmission/reception, for example, as the power is not turned on. The communicating state is a state in which the relay terminal 30 is on-line, but is communicating with another terminal. The holding state is a state in which the relay terminal 30 is on-line, but is not available at least for temporarily. The error state is a state in which the relay terminal 30 is not available due to an error.

The data quality checker 33, which is implemented by the CPU 201 of FIG. 4, searches the data quality management DB 3001 (FIG. 7) using the IP address of the counterpart terminal 10B as a search key to extract information regarding the quality of image data suitable to communication with the counterpart terminal 10B. Based on the extracted information regarding the quality of image data, the relay terminal 30 determines the quality of image data to be transmitted to the counterpart terminal 10B.

The data quality manager 34, which may be implemented by the CPU 201 of FIG. 4, changes the contents of the data quality management DB 3001 based on the quality information that is received from the management system 50. For example, assuming that the request terminal 10aa having the terminal ID "01aa" communicates with the counterpart terminal 10db having the terminal ID "01db" to transmit or receive high quality image data during videoconference, transmission of image data may delay for various reasons. For example, if a request terminal 10bb and a counterpart terminal 10ca start videoconference over the communication network 2, transmission of image data from the request terminal 10aa to the counterpart terminal 10db tends to slow down due to the increase in traffic. In such case, the relay terminal 30 changes the quality of image data to be transmitted from high image quality to lower image quality. More specifically, the contents in the data quality management DB 3001 is changed from high-level image quality to medium-level image quality, based on the quality information indicating the use of medium-level image quality.

The data quality changer 35, which may be implemented by the CPU 201 of FIG. 4, changes the quality of image data received from the request terminal 10 to the quality of image data according to the contents of the data quality management DB 3001. The memory control 39 is implemented by the HDD 205 of FIG. 4 according to an instruction received from the CPU 201. The memory control 39 stores various data in the memory 3000, or reads out various data from the memory 3000.

<Functional Structure of Communication Management System>

Next, a functional structure of the communication management system 50 is explained according to an example embodiment of the present invention. The management system 50 includes a data transmit/receive 51, a terminal authenticator 52, a state manager 53, a terminal extractor 54, a terminal state obtainer 55, a primary relay terminal selection unit 56, a session manager 57, a quality determiner 58, a memory control 59, and a delay time manager 60. These units shown in FIG. 5 correspond to a plurality of functions or functional modules, which are executed according to an instruction of the CPU 201 (FIG. 4) that is generated according to the communication management program being loaded from the ROM 202 onto the RAM 203. The communication management system 50 further includes a memory 5000, which may be implemented by any one of the ROM 202, RAM 203, and HDD 205 of FIG. 4.

(Relay Terminal Management Table)

The memory 5000 includes a relay terminal management database (DB) 5001, which stores therein a relay terminal management table of FIG. 8. The relay terminal management table of FIG. 8 stores, for each relay terminal ID of the terminal 30, the operation state of the relay terminal 30, the received date and time at which the management system 50 receives the state information indicating the operation state of the relay terminal 30 from the relay terminal 30, the IP address of the relay terminal 30, and the maximum data transmission speed of the relay terminal 30 in Mbps. For example, for the relay terminal 30a having the relay terminal ID "111a", the relay terminal management table indicates that the operation state is "ON LINE", the received date and time at which the management system 50 receives the state information is "13:00PM of 11/10/2009", the IP address of the relay terminal 30a is "1.2.1.2", and the maximum data transmission speed of the relay terminal 30a is 100 Mbps.

(Terminal Authentication Management Table)

The memory 5000 further includes a terminal authentication management database (DB) 5002, which stores a terminal authentication management table of FIG. 9. The terminal authentication management table of FIG. 9 stores a plurality of terminal IDs respectively assigned to the terminals 10 that are managed by the management system 50, in association with a plurality of passwords that are previously determined for the respective terminals 10. For example, referring to the terminal authentication management table of FIG. 9, the terminal 10aa having the terminal ID "01aa" is assigned with the password "aaaa".

(Terminal Management Table)

The memory 5000 further includes a terminal management database (DB) 5003, which stores a terminal management table of FIG. 10. The terminal management table of FIG. 10 stores, for each one of the terminal IDs assigned to the terminals 10, the operation state of the terminal 10, the received date and time at which the management system 50 receives the login request information from the terminal 10, and the IP address of the terminal 10. For example, for the terminal 10aa having the terminal ID "01aa", the terminal management table of FIG. 10 indicates that the operation state of the terminal 10aa is on-line ("ON LINE"), the received date and time is "13:40PM, 11/10/2009", and the IP address of the terminal 10aa is "1.2.1.3".

(Candidate List Management Table)

The memory 5000 further includes a candidate list management database (DB) 5004, which stores a candidate list management table of FIG. 11. The candidate list management table of FIG. 11 stores, for each one of a plurality of request terminals 10A capable of requesting for videoconference communication, the terminal ID of the request terminal 10A, and one or more terminal IDs that are respectively assigned to candidate terminals 10 that are previously registered for the request terminal 10A. In this example, for the request terminal 10A, one or more terminals 10 of the communication system 1 of FIG. 1 are previously registered as the candidate terminal 10. For example, the candidate list management table of FIG. 11 indicates that the request terminal 10aa having the terminal ID "01aa" is most likely to request for videoconference with respect to the terminal 10ab having the terminal ID "01ab", the terminal 10ba having the terminal ID "01ba", and the terminal 10db having the terminal ID "01db". The management system 50 manages the candidate list management table of FIG. 11, for example, according to a user instruction received from any one of the terminals 10. For example, in response to a user instruction received from the terminal 10aa, the management system 50 may add or delete the contents of the candidate list management table of FIG. 11.

(Session Management Table)

The memory 5000 further includes a session management database (DB) 5005, which stores a session management table of FIG. 12. The session management table of FIG. 12 stores information regarding each of the sessions that are carried out by at least two terminals 10 of the communication system 1 for the purpose of selecting the relay terminal 30 that is most suitable for communication between at least two terminals 10. More specifically, for each session ID that uniquely identifies each session, the session management table of FIG. 12 stores a relay terminal ID of the relay terminal 30 to be used for transmitting or receiving contents data such as image data and voice data, a terminal ID of the request terminal 10A, a terminal ID of the counterpart terminal 10B, a delay time ms indicating a time period required for receiving contents data at the counterpart terminal 10B, the date and time information indicating the time at which the management system 50 receives delay information from the counterpart terminal 10B.

For example, referring to the session management table of FIG. 12, for the session having the session ID "se1", the relay terminal 30a having the relay terminal ID "111a" is selected to relay contents data between the request terminal 10aa having the terminal ID "01aa" and the counterpart terminal 10db having the terminal ID "01db". Further, the management system 50 receives the delay information from the counterpart terminal 10db at 14:00PM, 11/10/2009. Based on this date and time information, the delay time ms of 200 milliseconds (ms) is obtained.

In case of having videoconference between only two terminals 10, the delay time may be determined based on the time when the management system 50 receives the delay information transmitted from the request terminal 10A rather than based on the time when the management system 50 receives the delay information transmitted from the counterpart terminal 10B. In case of having videoconference with more than two terminals 10, the delay information transmitted from the counterpart terminal 10B that receives the contents data is used to manage the date and time at which the delay information is received.

(Address Priority Management Table)

The memory 5000 further includes a priority management database (DB) 5006, which stores an address priority management table of FIG. 13. The address priority management table of FIG. 13 defines a number of address priority points to be assigned to an arbitrary set of terminal 10 and relay terminal 30 based on the degree of similarity between the IP address of the terminal 10 and the IP address of the relay terminal 30. Assuming that the IP address of the terminal 10 and the IP address of the relay terminal 30 are each expressed in the form of four digital numbers as described above referring to FIG. 1, as the degree of similarity between the terminal IP address and the relay terminal IP address increases, a larger number of address priority points is assigned. In FIG. 13, the "S" indicates that one digit of the IP address, which may be referred to as the dot address, is the same for both of the terminal 10 and the relay terminal 30. The "D" indicates that one digit of the IP address, or the dot address, is different between the terminal 10 and the relay terminal 30. More specifically, in this example, when the first to third digits or dot addresses are the same between the terminal 10 and the relay terminal 30, the address priority point is 5. When the first and second digits or dot addresses are the same between the terminal 10 and the relay terminal 30, the address priority point is 3. In such case, the fourth digit or dot address does not affect the address priority point. When the first digit or dot address is the same between the terminal 10 and the relay terminal 30, the address priority point is 1. In such case, the third and fourth digits or dot addresses do not affect the address priority point. When the first digit or dot address is different between the terminal 10 and the relay terminal 30, the address priority point is 0. In such case, the second to fourth digits or dot addresses do not affect the address priority point.

(Transmission Speed Priority Management Table)

The priority management DB 5006 of the memory 5000 further includes a transmission speed priority management table of FIG. 14. The transmission speed priority management table of FIG. 14 stores a range of the maximum data transmission speeds in association with a transmission speed priority point. More specifically, the transmission speed priority management table of FIG. 14 indicates that the transmission speed priority point increases with the increase in value of the maximum data transmission speeds at the relay terminal 30. For example, referring to FIG. 14, when the maximum data transmission speed at the relay terminal 30 is equal to or greater than 1000 Mbps, the transmission speed priority point of 5 is assigned. For example, when the maximum data transmission speed at the relay terminal 30 is equal to or greater than 100 Mbps but less than 1000 Mbps, the transmission speed priority point of 3 is assigned. When the maximum data transmission speed at the relay terminal 30 is equal to or greater than 10 Mbps but less than 100 Mbps, the transmission speed priority point of 1 is assigned. When the maximum data transmission speed at the relay terminal 30 is less than 10 Mbps, the transmission speed priority point of 0 is assigned.

(Quality Management Table)

The memory 5000 further includes a quality management database (DB) 5007, which stores a quality management table of FIG. 15. The quality management table of FIG. 15 stores the delay time ms of image data in association with the quality of image data. More specifically, the quality management table of FIG. 15 indicates that the quality of image data to be processed by the relay terminal 30 is lowered, as the delay time ms of the image data at the request terminal 10A or the counterpart terminal 10B increases. For example, when the delay time ms is equal to or greater than 0 milliseconds (ms), but less than 100 ms, the image data quality is high. When the delay time ms is equal to or greater than 100 ms but less than 300 ms, the image data quality is medium. When the delay time ms is equal to or greater than 300 but less than 500 ms, the image data quality is low. When the delay time ms is equal to or greater than 500 ms, the management system 50 interrupts operation of transmitting data.

(Functional Structure of Management System)

Referring back to FIG. 5, a functional structure of the communication management system 50 is explained.

The data transmit/receive 51, which may be implemented by the network I/F 209 (FIG. 4) according to an instruction received from the CPU 201, transmits or receives various data or information to or from another terminal, device, or system through the communication network 2.

Under control of the CPU 201 (FIG. 4), the terminal authenticator 52 obtains a terminal ID and a password from the login request information that is received from the data transmit/receive 51. Using the terminal ID and the password as a search key, the terminal authenticator 52 searches the terminal authentication management DB 5002 (FIG. 9) to determine whether the obtained set of terminal ID and password is registered. Based on the search result, the terminal authenticator 52 determines whether the user at the terminal 10 or the terminal 10 is allowed for access.

The state manager 53, which operates according to an instruction received from the CPU 201 (FIG. 4), manages the operation state of the request terminal 10A that sends the login request information using the terminal management DB 5003 (FIG. 10). More specifically, the state manager 53 stores the terminal ID of the request terminal 10A, the operation state of the request terminal 10A, the date and time at which the management system 50 receives the login request information from the request terminal 10A, and the IP address of the request terminal 10A.

The terminal extractor 54, which operates according to an instruction received from the CPU 201 (FIG. 4), searches the candidate list management DB 5004 (FIG. 11) using the terminal ID of the request terminal 10A as a key to obtain a list of terminal IDs each being assigned to a plurality of candidate terminals 10. Additionally, the terminal extractor 54 searches the candidate list management DB 5004 (FIG. 11) using the terminal ID of the request terminal 10A as a key to obtain a terminal ID of another request terminal 10A that registers the request terminal 10A as a candidate terminal for another request terminal 10A.

The terminal state obtainer 55, which operates under control of the CPU 201 (FIG. 4), searches the terminal management DB 5003 (FIG. 10) using the terminal ID of each candidate terminal 10 that is extracted by the terminal extractor 54 as a key to obtain the state information of each candidate terminal 10. Accordingly, the terminal state obtainer 55 obtains the operation state of each of the candidate terminal 10 that is previously determined for the request terminal 10A that sends the login request information. Further, the terminal state obtainer 55 searches the terminal management DB 5003 using the terminal ID extracted by the terminal extractor 54 as a key to obtain the state information of the request terminal 10A that sends the login request information.

The primary relay terminal selection unit 56, which operates according to an instruction received from the CPU 201 (FIG. 4), limits a number of relay terminals 30 each of which is a candidate relay terminal 30 that may be used for relaying contents data between at least two terminals 10. Based on the result obtained by the primary relay terminal selection unit 56, the secondary relay terminal selection unit 16 of the terminal 10 selects one terminal 30 that is most suitable for communication between at least two terminals 10. Referring to FIG. 5, the primary relay terminal selection unit 56 includes a session ID generator 56a, a terminal IP address extractor 56b, a primary selector 56c, and a priority determiner 56d. The session ID generator 56a of the primary relay terminal selection unit 56 generates a session ID for identifying a session that is used for selecting the relay terminal 30. The terminal IP address extractor 56b extracts the terminal ID of the request terminal 10A and the terminal ID of the counterpart terminal 10B respectively from the session request information received from the request terminal 10A, and searches the terminal management DB 5003 (FIG. 10) to obtain the IP address of the request terminal 10A and the IP address of the counterpart terminal 10B. The primary selector 56c selects one or more relay terminals 30 having the online state from the relay terminal management DB 5001 (FIG. 8) to obtain the relay terminal ID of the selected relay terminal 30. In this example, it is assumed that more than two relay terminals 30 are selected as having the on-line state.

Further, the primary selector 56c obtains the IP address of each of the selected relay terminals 30. Once the IP address of the relay terminal 30 is obtained for each relay terminal 30, the primary selector 56c compares the IP address of the relay terminal 30 with at least one of the IP address of the request terminal 10A and the IP address of the counterpart terminal 10B that are respectively obtained by the terminal IP address extractor 56b to analyze the degree of similarity between the IP address of the terminal 10 and the IP address of the relay terminal 30. More specifically, the primary selector 56c compares between the IP address of the terminal 10 and the IP address of the relay terminal 30, digit by digit, or dot address by dot address, to determine the degree of similarity. Using the address priority management table of FIG. 13, the primary selector 56c obtains the address priority point for each one of the relay terminals 30. Assuming that the primary selector 56c compares the IP address of the terminal 10 with the IP address of the relay terminal 30, respectively for the request terminal 10A and the counterpart terminal 10B, the primary selector 56c obtains two address priority points for each one of the relay terminals 30. In such case, the primary selector 56c selects the highest one of the address priority points as the address priority point for the relay terminal 30. Additionally, for each of the selected relay terminals 30 having the on-line state, the primary selector 56c obtains the maximum data transmission speed of the relay terminal 30 from the relay terminal management table of FIG. 8. Using the transmission speed priority management table of FIG. 14, the primary selector 506c obtains the transmission speed priority point that corresponds to the maximum data transmission speed of the selected relay terminal 30, for each of the selected relay terminals 30. For each of the relay terminals 30, the primary selector 56c obtains a total priority point by adding the address priority point and the transmission speed priority point together. In this example, the primary selector 56c selects two relay terminals 30 including the relay terminal 30 having the highest total priority point and the relay terminal 30 having the second highest total priority point.

In this example, a number of relay terminals 30 that is finally selected by the primary selector 56c is not limited to two such that more than two relay terminals 30 may be finally selected for further processing as long as a number of relay terminals 30 is sufficiently reduced.

The priority determiner 56d refers to the address priority management DB 5006 (FIG. 13) to determine the address priority point for each one of the relay terminals 30 that is selected by the primary selector 56c. The priority determiner 56d obtains the maximum data transmission speed of the relay terminal 30 from the relay terminal management DB 5001 (FIG. 8), and refers to the transmission speed priority management DB 5006 (FIG. 14) to obtain the transmission speed priority point of the relay terminal 30 that is selected by the primary selector 56c.

The session manager 57, which operates according to an instruction received from the CPU 201, stores the session ID generated by the session ID generator 56a, the terminal ID of the request terminal 10A, and the terminal ID of the counterpart terminal 10B, in a corresponding manner, in the session management DB 5005 (FIG. 12) of the memory 5000. The session manager 57 further stores the relay terminal ID of the relay terminal 30 that is finally selected by the secondary selector 16c of the terminal 10 for each session ID, in the session management DB 5005 (FIG. 12).

The quality determiner 58, which operates according to an instruction received from the CPU 201 (FIG. 4), searches the quality management DB 5007 (FIG. 15) using the delay time ms obtained for the selected relay terminal 30 to obtain the image data quality that is desirable for communication using the relay terminal 30. The memory control 59, which operates according to an instruction received from the CPU 201 (FIG. 4) in relation with the HDD 205 (FIG. 4), stores various data in the memory 5000 or read out various data from the memory 5000.

The delay time manager 60 searches the terminal management DB 5003 (FIG. 10) using the IP address of the counterpart terminal 10B to obtain the terminal ID of the counterpart terminal 10B. The delay time manager 60 further manages the session management table of FIG. 12 stored in the session management DB 5005 so as to keep updated the value stored in the "delay time" field for the obtained terminal ID of the counterpart terminal 10B.

<Operation of Communication System>

Figure 16:
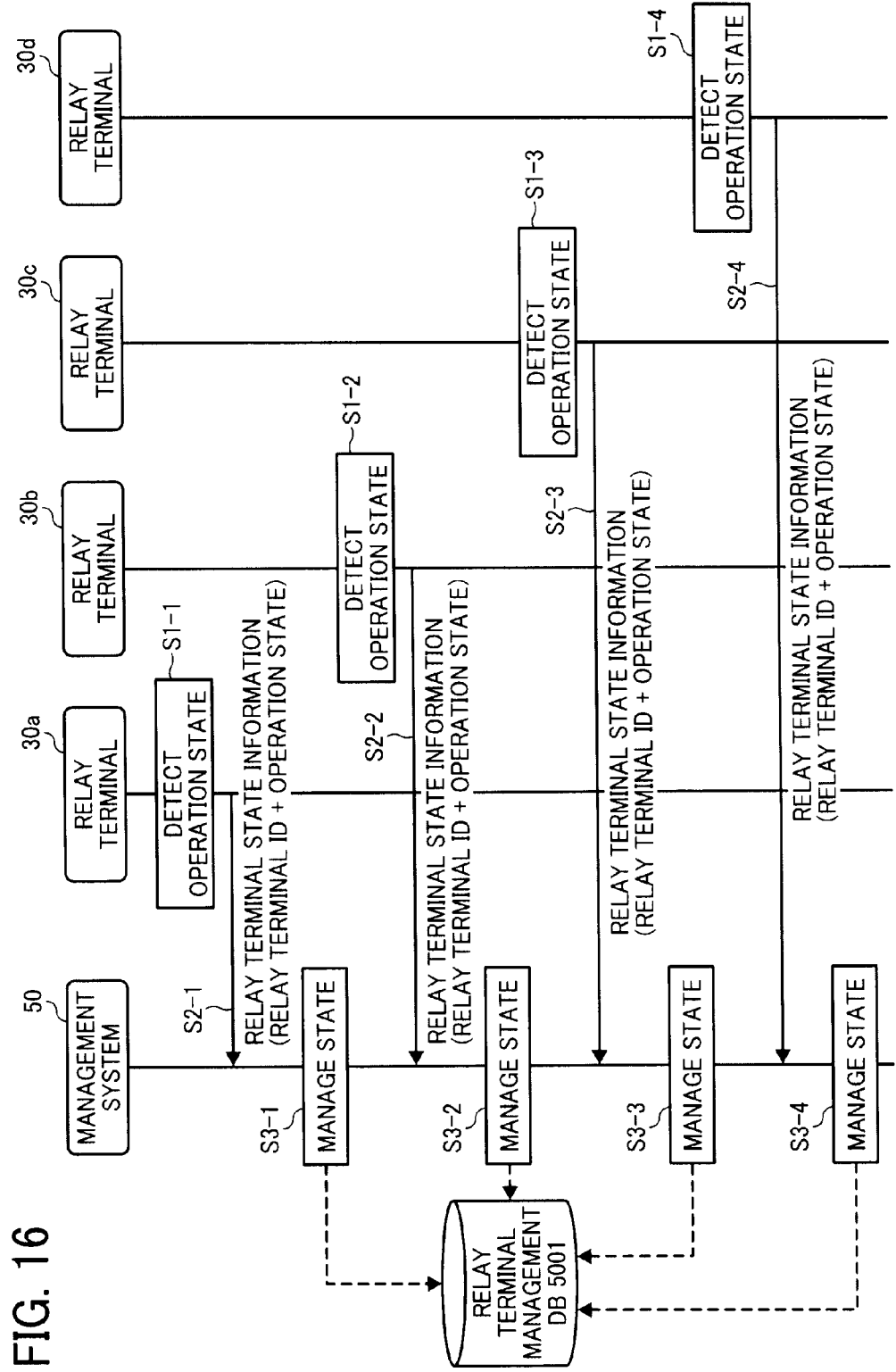
FIG. 16 is a data sequence diagram illustrating operation of managing state information indicating an operation state of the relay terminal of the communication system of FIG. 1, according to an example embodiment of the present invention.
Figure 17:
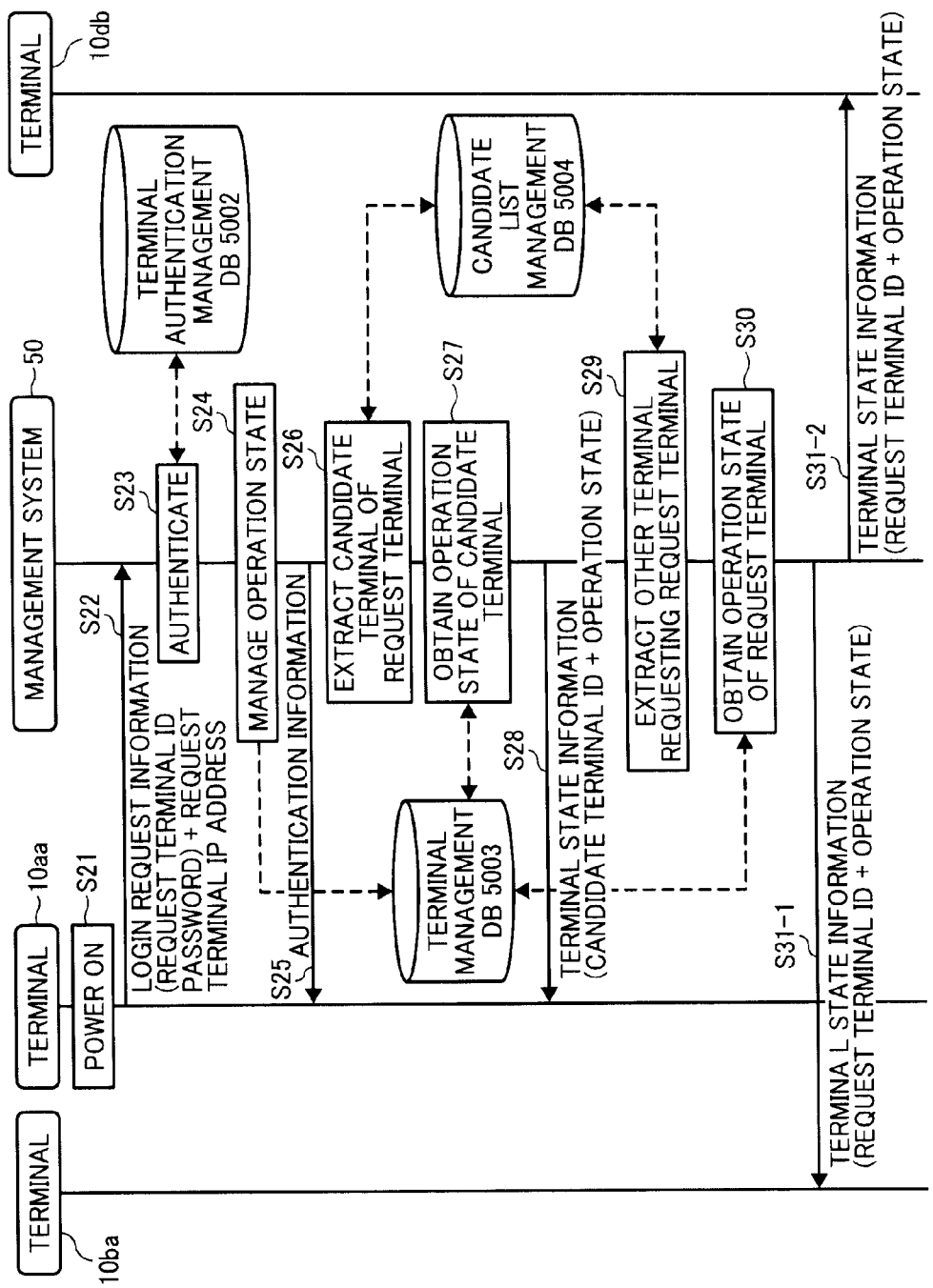
FIG. 17 is a data sequence diagram illustrating operation of establishing communication among two or more terminals of the communication system of FIG. 1, according to an example embodiment of the present invention.
Figure 18:
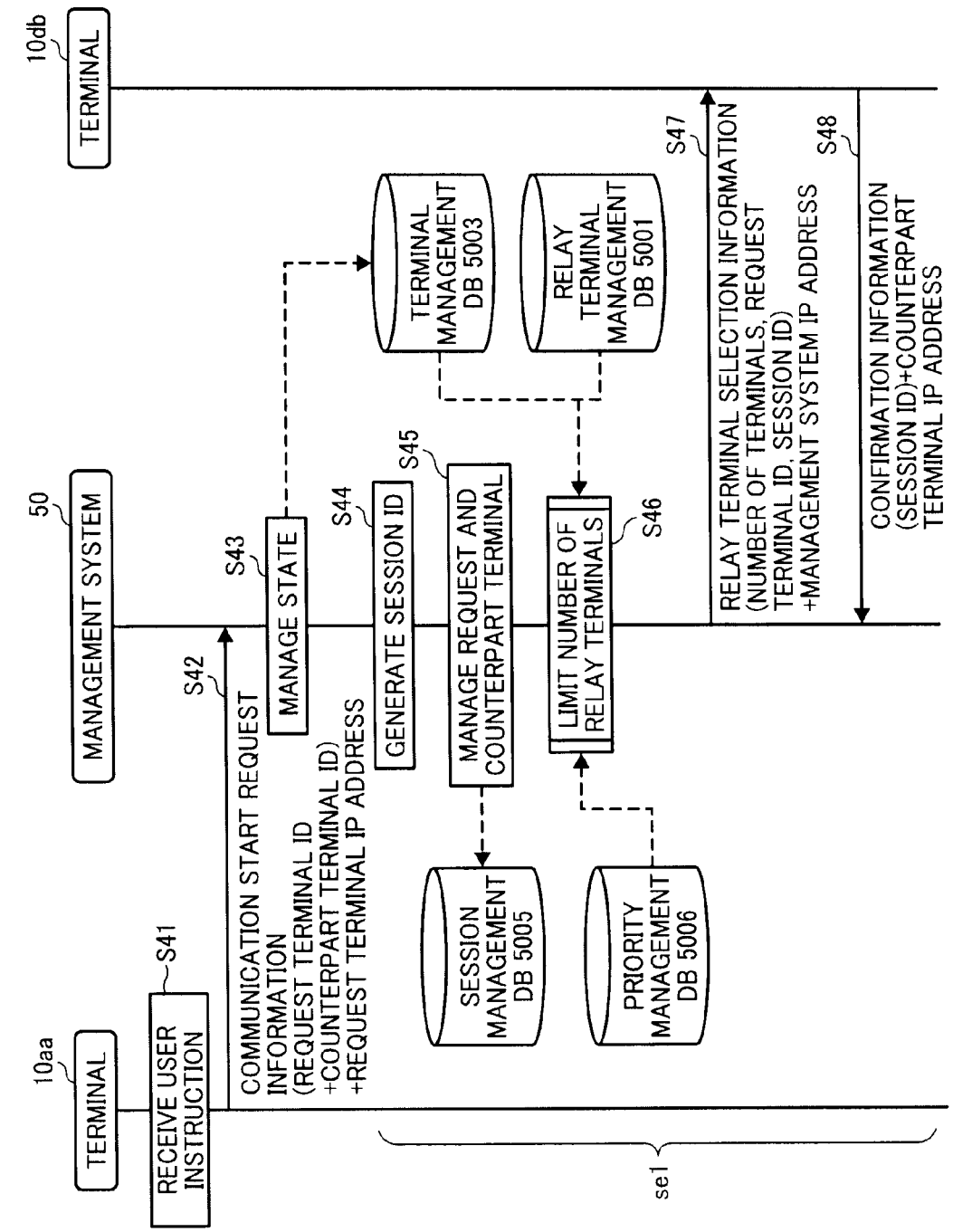
FIG. 18 is a data sequence diagram illustrating operation of limiting a number of candidate relay terminals, performed by the communication system of FIG. 1.
Figure 19:
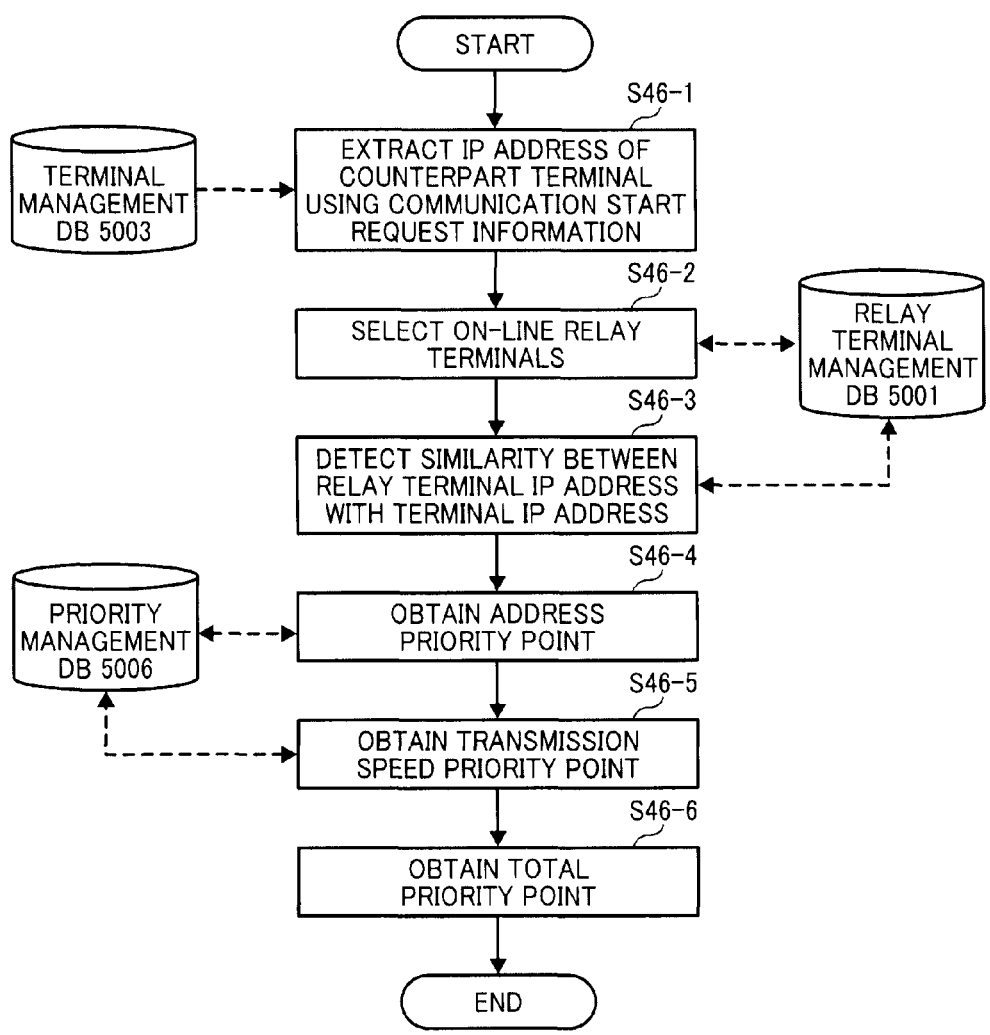
FIG. 19 is a flowchart illustrating operation of limiting a number of candidate relay terminals, performed by the communication management system of FIG. 5.

Referring now to FIGS. 16 to 23, and 26 to 30, example operation of the communication system of FIG. 1 is explained. FIG. 16 is a data sequence diagram illustrating operation of managing state information indicating an operation state of the relay terminal 30, which is transmitted from the relay terminal 30 to the communication management system 50. FIG. 17 is a data sequence diagram illustrating operation of establishing communication among two or more terminals 10 of the communication system of FIG. 1. FIG. 18 is a data sequence diagram illustrating operation of limiting a number of candidate relay terminals. FIG. 19 is a flowchart illustrating operation of limiting a number of candidate relay terminals. FIG. 20 is a table storing priority points of the relay terminals that are respectively calculated by the communication management system 50. FIGS. 21A and 21B are a data sequence diagram illustrating operation of selecting the relay terminal 30, performed by the communication terminal 10.

Figure 22:
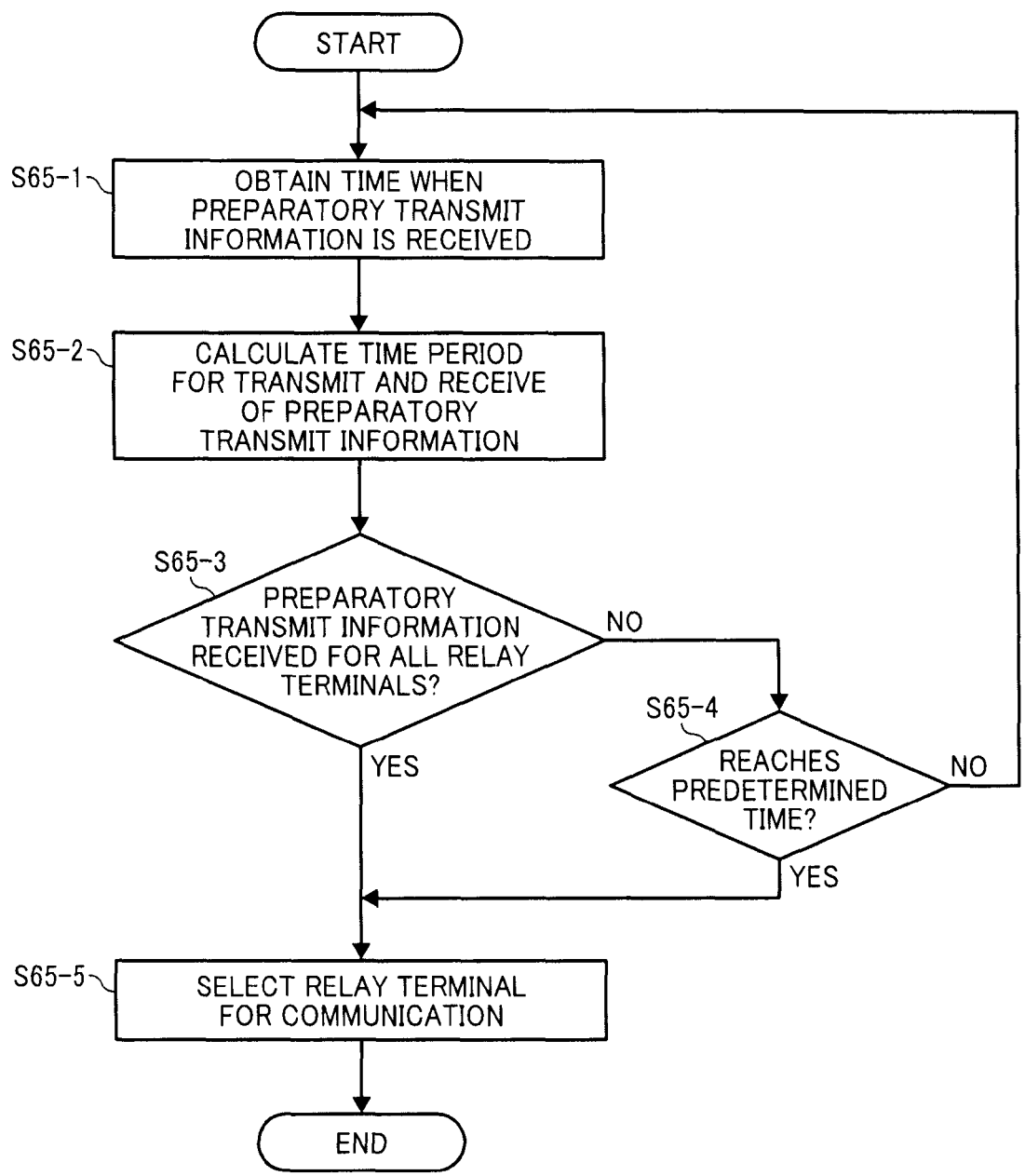
FIG. 22 is a flowchart illustrating operation of selecting a relay terminal, performed by the terminal of FIG. 5.
Figure 23:
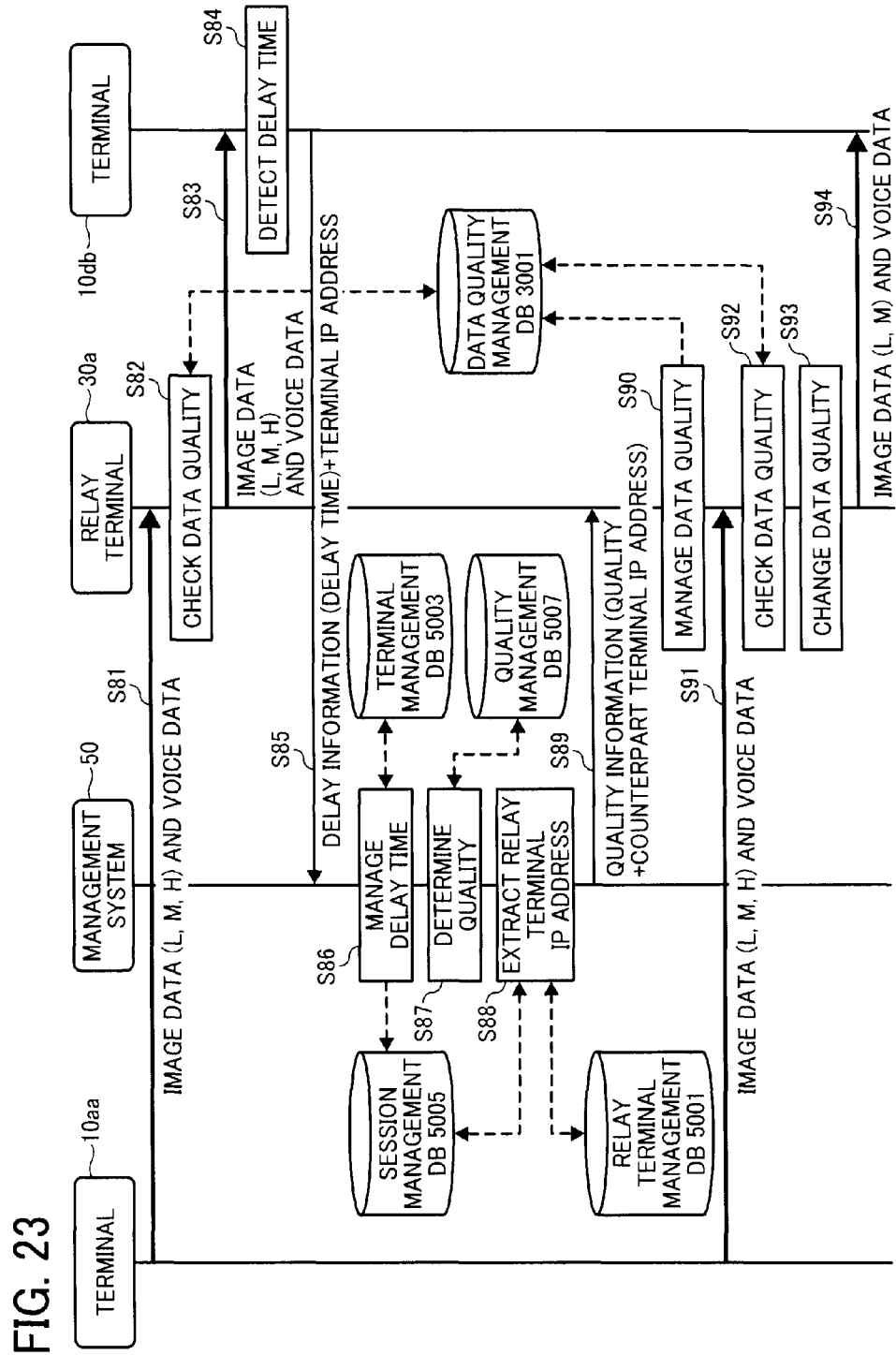
FIG. 23 is a data sequence diagram illustrating operation of transmitting or receiving data such as image data and voice data, performed by two or more terminals of the communication system of FIG. 1.
Figure 26:
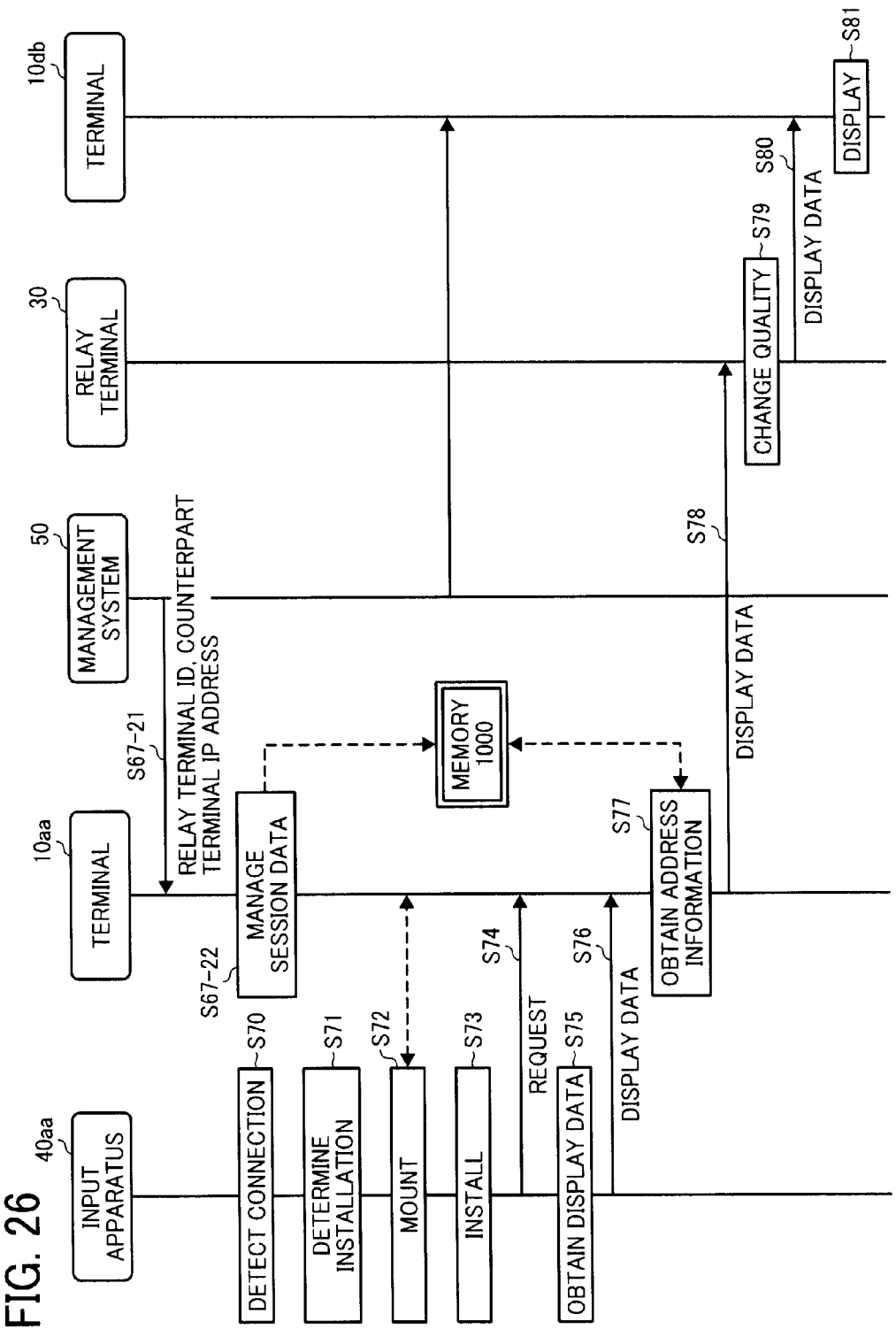
FIG. 26 is a data sequence diagram illustrating operation of displaying data displayed by the external input apparatus of FIG. 1 through the counterpart communication terminal of FIG. 1.
Figure 27:
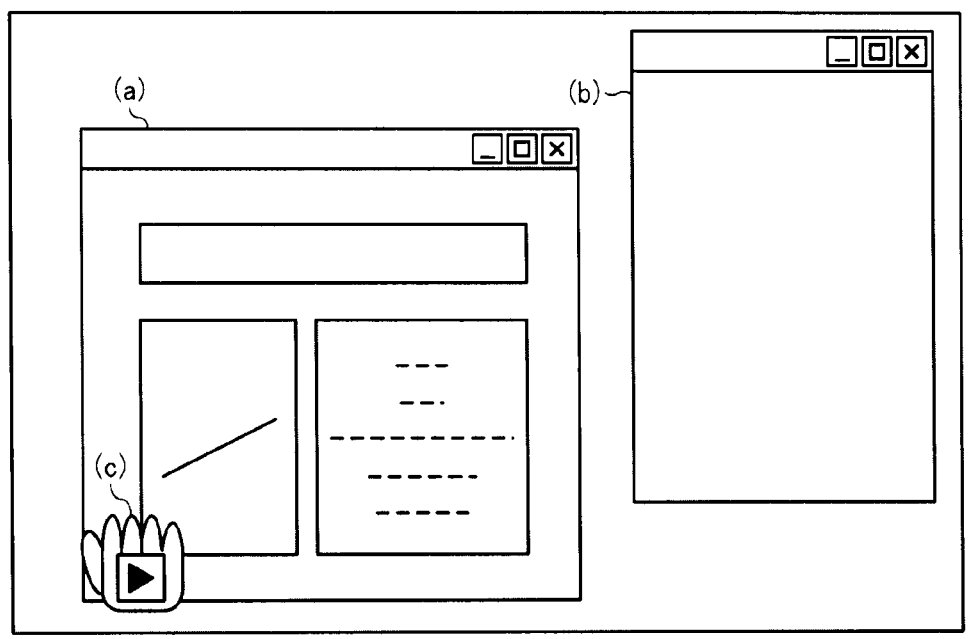
FIG. 27 is an example screen displayed by the external input apparatus of FIG. 1.
Figure 28:
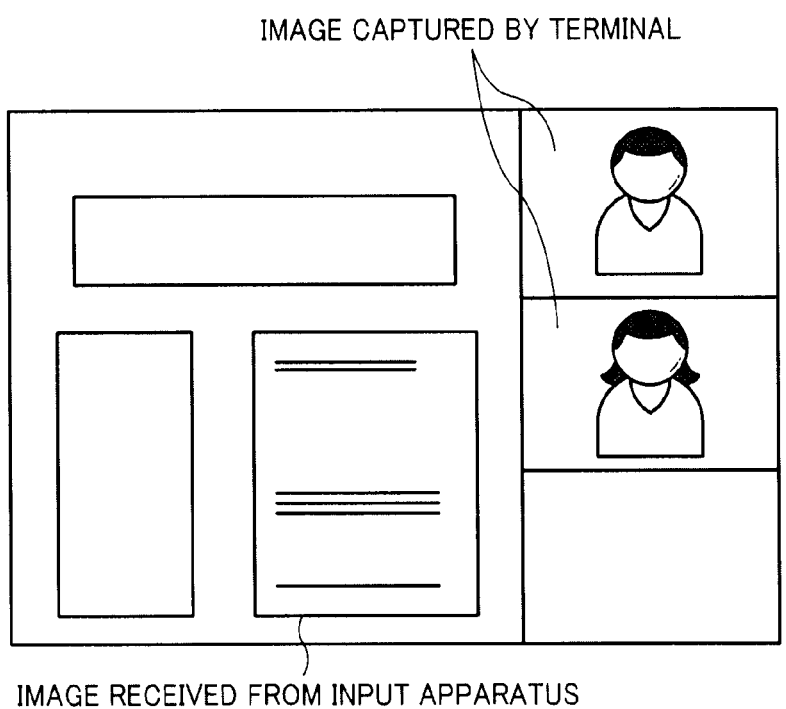
FIG. 28 is an example screen including image data and data displayed by the input apparatus, displayed by the communication terminal of FIG. 1.
Figure 29:
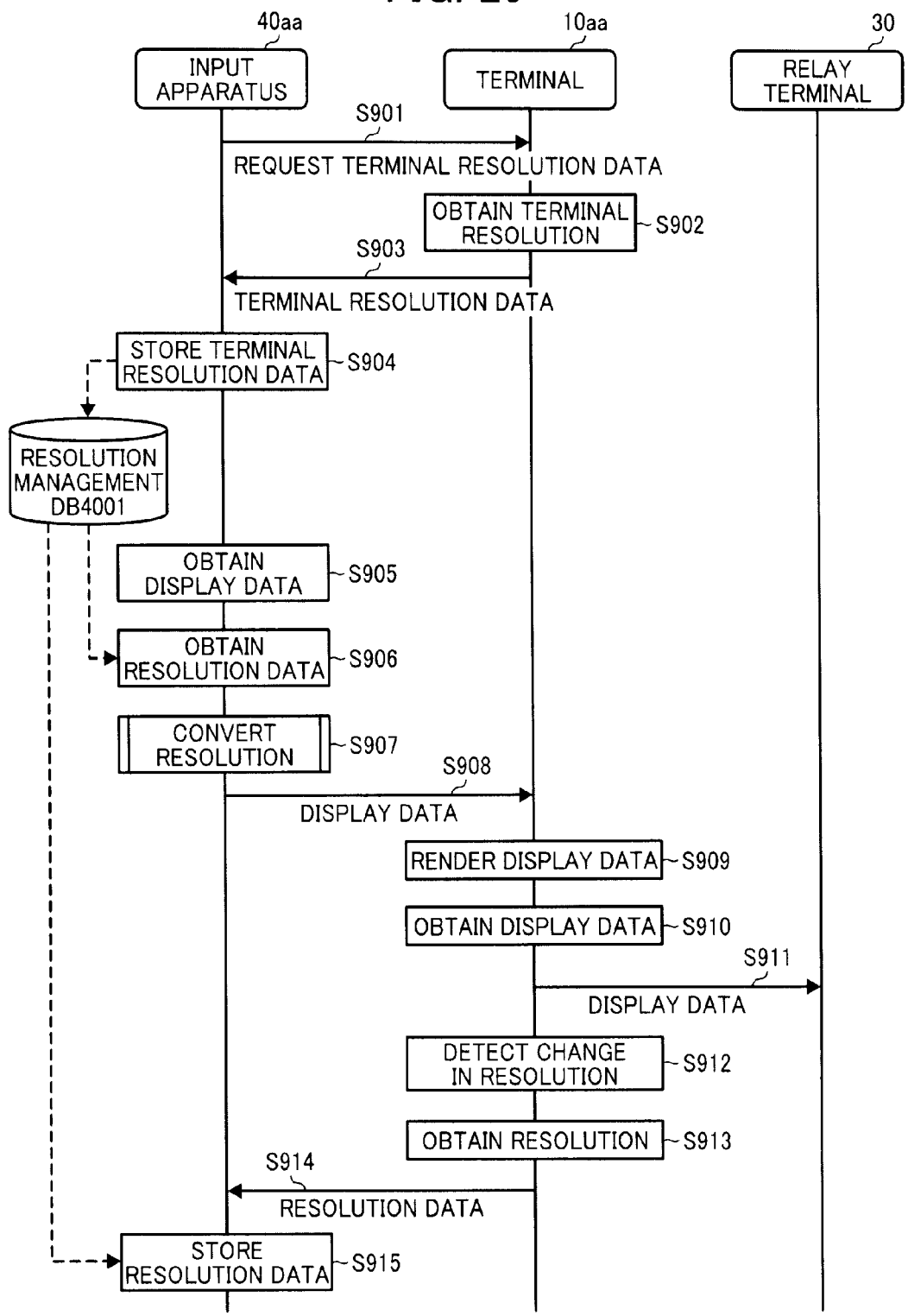
FIG. 29 is a data sequence diagram illustrating operation of converting resolution, performed by the communication system of FIG. 1.
Figure 30:
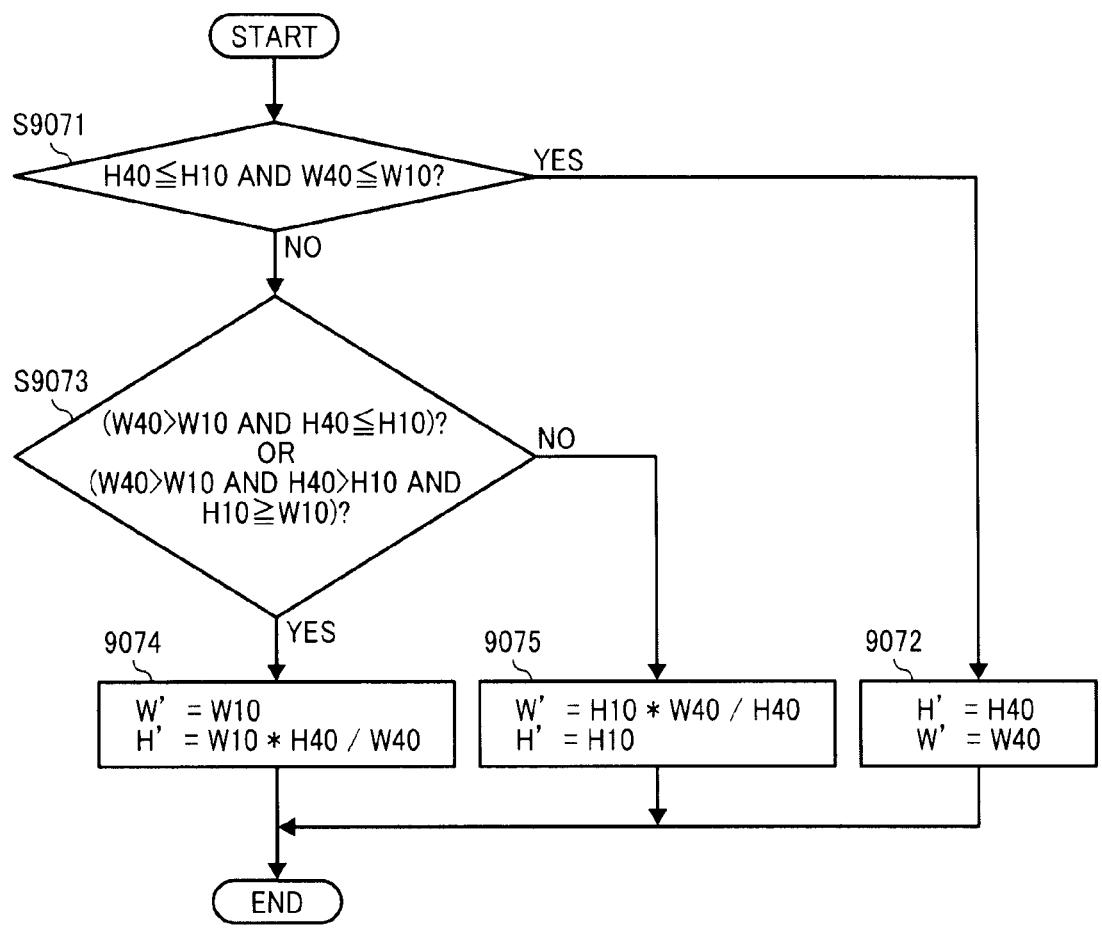
FIG. 30 is a flowchart illustrating operation of converting resolution.

FIG. 22 is a flowchart illustrating operation of selecting the relay terminal 30 performed by the communication terminal 10. FIG. 23 is a data sequence diagram illustrating operation of transmitting or receiving data such as image data and voice data, performed by two or more terminals 10. FIG. 26 is a data sequence diagram illustrating operation of displaying display data displayed by the external input apparatus 40 through the counterpart communication terminal 10. FIG. 27 is an example screen displayed by the external input apparatus 40. FIG. 28 is an example screen including image data and display data that are displayed by the communication terminal 10. FIG. 29 is a data sequence diagram illustrating operation of converting resolution of display data. FIG. 30 is a flowchart illustrating operation of converting resolution of display data.

Referring now to FIG. 16, operation of managing state information of the relay terminal 30, which is sent from each relay terminal 30 to the management system 50, performed by the communication system 1 is explained according to an example embodiment of the present invention. In this example, it is assumed that the relay terminals 30a, 30b, 30c, and 30d, which may be each or collectively referred to as the relay terminal 30, exist in the communication system 1.

At S1-1, S1-2, S1-3, and S1-4, the relay terminals 30a, 30b, 30c, and 30d each periodically monitors the operation state of the relay terminal 30. This monitoring is performed by the state detector 32 (FIG. 5) of the relay terminal 30.

At S2-1, S2-2, S2-3, and S2-4, the data transmit/receive 31 of the relay terminal 30 periodically transmits state information of the relay terminal 30 to the management system 50 through the communication network 2. With the state information of the relay terminal 30 that is periodically received, the management system 50 is able to manage the operation state of the relay terminal 30 in realtime. The state information of the relay terminal 30 includes an operation state of the relay terminal 30 that is detected by the state detector 32 of the relay terminal 30, which is sent together with a relay terminal ID that uniquely identifies each relay terminal 30. For the descriptive purposes, in this example, it is assumed that the relay terminals 30a, 30b, and 30d each have the on-line state, and the relay terminal 30c has the off-line state due to the failure in relay control program of the relay terminal 30c.

At S3-1, S3-2, S3-3, and S3-4, the management system 50 receives the state information from the relay terminal 30 at the data transmit/receive 51, and stores the received state information of the relay terminal 30 in the memory 5000 through the memory control 59. More specifically, the memory control 59 stores the state information of each relay terminal 30 in association with the relay terminal ID of the corresponding relay terminal 30 in the relay terminal management DB 5001 (FIG. 8).

For example, referring to FIG. 8, the management system 50 stores the state information of the relay terminal 30 indicating whether the relay terminal 30 is on-line, off-line, or in trouble, etc., in association with the relay terminal ID of the relay terminal 30. Additionally, the management system 50 stores the date and time information indicating the time when the management system 50 receives the state information of the relay terminal 30 in association with the relay terminal ID of the relay terminal 30. When the management system 50 does not receive any state information from the relay terminal 30, the relay terminal management table of FIG. 8 has an empty value for the "operation state" field and the "date and time" field for the subjected relay terminal 30. Alternatively, the value of the "operation state" field and the value of the "date and time" field may reflect the state information that is previously sent by the subjected relay terminal 30 to the management system 50 such that the relay terminal management table of FIG. 8 retains such value.

Referring now to FIG. 17, operation of transmitting and receiving various management data before starting videoconference by the request terminal 10aa is explained, according to an example embodiment of the present invention. At S21, the user at the request terminal 10aa turns on the power of the request terminal 10aa through the power switch 109 (FIG. 3). The operation input 12 of the request terminal 10aa (FIG. 5) turns on the power of the request terminal 10aa.

At S22, as the power of the request terminal 10aa is turned on, the login request 13 of the request terminal 10aa automatically causes the data transmit/receive 11 to send the login request information that requests the login process to the management system 50 through the communication network 2. The login request information includes a terminal ID that identifies the request terminal 10aa, and a password assigned to the request terminal 10aa. The terminal ID and the password may be obtained by the memory control 19 from the memory 1000, and sent to the data transmit/receive 11. At the time of sending the login request information from the request terminal 10aa to the management system 50, the request terminal 10aa sends an IP address of the request terminal 10aa such that the management system 50 knows the IP address of the request terminal 10aa.

At S23, the terminal authenticator 52 of the management system 50 searches the terminal authentication management DB 5002 (FIG. 9) stored in the memory 5000 using the terminal ID and the password of the login request information received through the data transmit/receive 51. When it is determined that the terminal ID and the password of the login request information is stored in the terminal authentication management DB 5002, the terminal authenticator 52 determines that the terminal 10aa is authenticated.

At S24, when the terminal authenticator 52 authenticates that the login request information is received from the authenticated terminal 10, the state manager 53 of the management system 50 stores the operation state, the date and time at which the login request information is received, and the IP address of the terminal 10aa, with respect to the terminal ID in the terminal management DB 5003 (FIG. 10) to create a record of the terminal 10aa. Using the terminal management table of FIG. 10, which stores the operations state of online, the date and time of "13:40, 11/10/2009", and the terminal IP address of "1.2.1.3" in association with the terminal ID "01aa", various information regarding the terminal 10aa can be managed.

At S25, the data transmit/receive 51 of the management system 50 sends the authentication result obtained by the terminal authenticator 52 to the request terminal 10aa that has sent the login request information through the communication network 2. As described above, in this example, it is assumed that the terminal authenticator 52 determines that the terminal 10aa is an authenticated terminal.

At S26, the terminal extractor 54 of the management system 50 searches the candidate list management table of FIG. 11 using the terminal ID "01aa" of the request terminal 10aa that has sent the login request information to extract a terminal ID of a candidate terminal 10 that is previously registered for the request terminal 10aa. For example, referring to FIG. 11, the terminal extractor 54 extracts terminal IDs including "01ab", "01ba", and "01db" of the candidate terminals 10ab, 10ba, and 10db for the request terminal 10aa having the terminal ID of "01aa".

At S27, the terminal state obtainer 55 searches the terminal management table of FIG. 10 using the terminal IDs of the candidate terminals 10 that are extracted by the terminal extractor 504, such as the terminal IDs "01ab", "01ba", and "01db", as a search key to obtain the operation states of the candidate terminals 10. Referring to FIG. 10, the operation states including "OFFLINE", "ONLINE", and "ONLINE" are obtained, respectively, for the candidate terminals 10ab, 10ba, and 10db.

At S28, the data transmit/receive 51 sends the candidate list information including the terminal ID used as a search key at S27, and the operation state of each candidate terminal 10, to the request terminal 10aa through the communication network 2. With this candidate list information, the request terminal 10aa is able to know the current operation state of each of the candidate terminals 10ab, 10ba, and 10db that are registered for the request terminal 10aa.

At S29, the terminal extractor 54 of the management system 50 searches the candidate list management table of FIG. 11 using the terminal ID "01aa" of the request terminal 10aa that has sent the login request information as a search key to extract a terminal ID of a terminal 10 that registers the request terminal 10aa as a candidate terminal. Referring to FIG. 11, the terminal IDs including "01ab", "01ba", and "01db" of the terminals 10ab, 10ba, and 10db are extracted as the terminal 10 having the request terminal 10aa as a candidate terminal.

At S30, the terminal state obtainer 55 searches the terminal management table of FIG. 10, stored in the terminal management DB 5003, using the terminal ID "01aa" of the request terminal 10aa that has sent the login request information to obtain the operation state of the request terminal 10aa.

At S31-1 and S31-2, the data transmit/receive 51 sends the terminal state information including the terminal ID "01aa" and the operation state "ONLINE" of the request terminal 10aa, which are obtained at S30, respectively, to the terminals 10ba and 10db. At this step, the data transmit/receive 51 sends the terminal state information to the terminal 10 having the operation state of "ONLINE". When transmitting the terminal state information to the terminals 10ba and 10db, the data transmit/receive 51 refers to the terminal management table of FIG. 10 to obtain an IP address of each of the terminals 10ba and 10db using the terminal ID "01ba" and "01db". With the IP address, the data transmit/receive 51 is able to communicate with the terminals 10ba and 10db to notify the terminal ID "01aa" of the request terminal 10aa and the operation state of the request terminal 10aa.

The above-described operation of S22 to S31-1 and S31-2 is performed by any desired terminal 10 as the power of the terminal 10 is turned on through the power switch 109 (FIG. 3).

Referring now to FIG. 18, operation of limiting a number of candidate relay terminals 30 is explained according to an example embodiment of the present invention. When the terminal state information is received from the management system 50, the operation input 12 (FIG. 5) of the request terminal 10aa generates a candidate list based on the terminal state information such as the operation state of each one of the candidate terminals 10 for display through the display 11. In this example, the request terminal 10aa is able to start videoconference with at least one of the terminals 10ba and 10db each having the on-line state and is available. For the descriptive purposes, it is assumed that the user at the request terminal 10aa starts videoconference with the terminal 10db.

At S41, the user at the request terminal 10aa operates the operation button 108 to select the terminal 10db as a counterpart terminal. Upon selection, the operation input 12 (FIG. 5) of the request terminal 10aa receives a user instruction for starting communication with the counterpart terminal 10db. At S42, the data transmit/receive 11 of the request terminal 10aa sends the communication start request information that requests the management system 50 to start communication with the counterpart terminal 10db to the management system 50. The communication start request information at least includes identification information such as the terminal ID "01aa" of the request terminal 10aa and the terminal ID "01db" of the counterpart terminal 10db, with a message requesting to start videoconference. At the time of receiving the communication start request information, the data transmit/receive 51 of the management system 50 obtains the IP address "1.2.1.3" of the request terminal 10aa.

At S43, the state manager 53 looks for records in the terminal management table of FIG. 10 stored in the terminal management DB 5003 based on the terminal ID "01aa" of the request terminal 10aa and the terminal ID "01db" of the counterpart terminal 10db, which are included in the communication start request information. The state manager 53 changes each of the operation states of the request terminal 10aa and the counterpart terminal 10db in the records, from the online state to the communicating state. At this time, the request terminal 10aa and the counterpart terminal 10db has not started communication, but the request terminal 10aa and the counterpart terminal 10db each have the communicating state. In case another terminal 10 tries to communicate with the request terminal 10aa or the counterpart terminal 10db, the management system 50 causes the another terminal 10 to output voice or display indicating that the request terminal 10aa or the counterpart terminal 10db is in the communicating state.

Next, operation of selecting the relay terminal 30 for communication, performed at S44 to S48, and S61-1 to S66 (FIGS. 21A and 21B), is explained according to an example embodiment of the present invention. At S44, the management system 50 prepares for a session that is performed for selecting the relay terminal 30 for communication between the request terminal 10aa and the counterpart terminal 10db. More specifically, at S44, the session ID generator 56a (FIG. 5) of the management system 50 generates a session ID for a session that is to be performed for selection of the relay terminal 30 that relays data between the request terminal 10aa and the counterpart terminal 10db.

At S45, the session manager 57 stores the session ID "sel" generated at S44, the terminal ID "01aa" of the request terminal 10aa, and the terminal ID "01db" of the counterpart terminal 10db, in the session management DB 5005 (FIG. 12) stored in the memory 5000.

At S46, the primary relay terminal selection unit 56 of the management system 50 limits a number of candidate relay terminals 30 from which one relay terminal 30 to be used for communication between the request terminal 10aa and the counterpart terminal 10db is selected, using the relay terminal management DB 5001, the terminal management DB 5003, and the priority management DB 5006.

Referring now to FIG. 19, operation performed at S46 of FIG. 18 is explained in detail. At S46-1, the terminal IP address extractor 56b of the management system 50 searches the terminal management DB 5003 (FIG. 10) using the terminal ID "01aa" of the request terminal 10aa and the terminal ID "01db" of the counterpart terminal 10db included in the communication start request information sent from the request terminal 10aa as a key to obtain the IP addresses of the terminals 10aa and 10db, i.e., the IP address "1.2.1.3" and the IP address "1.3.2.4".

At S46-2, the primary selector 56c refers to the relay terminal management DB 5001 (FIG. 8) to select one or more relay terminals 30 having the on-line operation state, and obtains the relay terminal ID of the selected relay terminal 30. More specifically, in this example, the primary selector 506c obtains the relay terminal IDs 111a, 111b, and 111d of the relay terminals 30a, 30b, and 30d.

At S46-3, the primary selector 56c searches the relay terminal management DB 5001 (FIG. 8) to obtain the IP address of each of the relay terminals 30a, 30b, and 30d, using the relay terminal IDs 111a, 111b, and 111d obtained at S46-2. Further, the primary selector 56c compares each one of the IP addresses "1.2.1.2", "1.2.2.2", and "1.3.2.2" of the relay terminals 30a, 30b, and 30d, with each one of the IP addresses "1.2.1.3" and "1.3.2.4" obtained at S46-1, dot address by dot address, to determine the degree of similarity between the relay terminal IP address and the terminal IP address.

At S46-4, the priority determiner 56d refers to the priority management DB 5006 (FIG. 13) to determine a value of address priority point for each one of the relay terminals 30a, 30b, and 30d. In this example, as illustrated in FIG. 20, for each one of the relay terminals 30a, 30b, and 30d, the priority determiner 56d obtains an address priority point with respect to the request terminal 10aa and an address priority point with respect to the counterpart terminal 10db. FIG. 20 illustrates a table storing a calculation result of a priority point, which is used for limiting a number of candidate relay terminals 30. The table of FIG. 20 stores an address priority point, a transmission speed priority point, and a total priority point, for each one of the relay terminals IDs of the relay terminals 30. The address priority point includes a first address priority point with respect to the request terminal 10aa, and a second address priority point with respect to the counterpart terminal 10db. The total priority point is obtained by adding the highest one of the first and second address priority points with the transmission speed priority point.

In this example, based on comparison between the IP address "1.2.1.2" of the relay terminal 30a and the IP address "1.2.1.3" of the request terminal 10aa, the degree of similarity is "S.S.S.D" such that the address priority point of 5 is obtained. Similarly, based on comparison between the IP address "1.2.1.2" of the relay terminal 30a and the IP address "1.3.2.4" of the counterpart terminal 10db, the degree of similarity is "S.D.D.D" such that the address priority point of 1 is obtained. Based on comparison between the IP address "1.2.2.2" of the relay terminal 30b and the IP address "1.2.1.3" of the request terminal 10aa, the degree of similarity is "S.S.D.D" such that the address priority point of 3 is obtained. Similarly, based on comparison between the IP address "1.2.2.2" of the relay terminal 30b and the IP address "1.3.2.4" of the counterpart terminal 10db, the degree of similarity is "S.D.S.D" such that the address priority point of 1 is obtained. Based on comparison between the IP address "1.3.2.2" of the relay terminal 30d and the IP address "1.2.1.3" of the request terminal 10aa, the degree of similarity is "S.D.D.D" such that the address priority point of 1 is obtained. Similarly, based on comparison between the IP address "1.3.2.2" of the relay terminal 30a and the IP address "1.3.2.4" of the counterpart terminal 10db, the degree of similarity is "S.S.S.D" such that the address priority point of 5 is obtained.

Referring back to FIG. 19, at S46-5, the priority determiner 56d searches the transmission speed priority management table of FIG. 14 of the priority management DB 5006 using the maximum data transmission speed of the relay terminal 30 that is stored in the relay terminal management table of FIG. 8 of the relay terminal management DB 5001 to determine a transmission priority point for each one of the relay terminals 30a, 30b, and 30d that are selected at S46-2. In this example, referring to FIG. 8 and FIG. 14, the relay terminal 30a having the maximum data transmission speed of 100 Mbps is assigned with the transmission priority point of 3.

Similarly, the relay terminal 30b having the maximum data transmission speed of 1000 Mbps is assigned with the transmission priority point of 5. Similarly, the relay terminal 30d having the maximum data transmission speed of 10 Mbps is assigned with the transmission priority point of 1. Accordingly, the priority determiner 506d stores the transmission priority point for each one of the relay terminals 30a, 30b, and 30d in the table of FIG. 20.

At S46-6, for each one of the relay terminals 30a, 30b, and 30d, the primary selector 56c adds the highest one of the first and second address priority points with the transmission speed priority point to obtain a total priority point. The primary selector 56c selects the total of two relay terminals 30 having the highest priority point. For example, the primary selector 56c selects the relay terminal 30 having the highest total priority point and the relay terminal 30 having the second highest total priority point as a candidate relay terminal 30 for further processing. In this example, referring to FIG. 20, the relay terminals 30a, 30b, and 30d having the relay terminal IDs 111a, 111b, and 111d respectively have the total priority points of 8, 8, and 6. Accordingly, the primary selector 56c selects the relay terminal 30a having the relay terminal ID 111a, and the relay terminal 30b having the relay terminal ID 111b.

After the operation of S46 described above referring to FIG. 19 completes, at S47 of FIG. 18, the data transmit/receive 51 (FIG. 5) of the management system 50 sends the relay terminal selection information to the counterpart terminal 10db through the communication network 2. The relay terminal selection information includes a number of candidate relay terminals 30, which is "2", the terminal ID "01aa" of the request terminal 10aa, and the session ID "sel" for relay terminal selection. With this relay terminal selection information, the counterpart terminal 10db is able to obtain information including the number of candidate relay terminals 30, the request terminal 10aa that requests for videoconference, and the session ID "sel" of the session for relay terminal selection. In addition, the counterpart terminal 10db obtains the IP address "1.1.1.2" of the management system 50 that has sent the relay terminal selection information.

At S48, the data transmit/receive 11 of the counterpart terminal 10db sends confirmation information indicating that the relay terminal selection information is received, to the management system 50 through the communication network 2, with the IP address of the counterpart terminal 10db. The confirmation information includes the session ID "sel". With this confirmation information, the management system 50 is able to know that the counterpart terminal 10db is notified with the number of candidate relay terminals 30 obtained during the session sel, and the IP address "1.3.2.4" of the counterpart terminal 10db.

Referring now to FIGS. 21 and 22, operation of selecting the relay terminal 30, performed by the terminal 10aa, is explained according to an example embodiment of the present invention. Before starting videoconference between the terminals 10aa and 10db, at S61-1 and S61-2, the communication management system 50 sends preparatory relay request information, respectively, to the relay terminals 30a and 30b, which are selected by the management system 50 at S46 as candidate relay terminals. The preparatory relay request information requests the relay terminal 30 to perform relay processing before starting the videoconference. More specifically, the preparatory relay request information includes the session ID "sel", the IP address "1.2.1.3" of the request terminal 10aa, and the IP address "1.3.2.4" of the counterpart terminal 10db, and is transmitted with the IP address of the management system 50. With this preparatory relay request information, the relay terminals 30a and 30b are each able to obtain information including the session, the request terminal, the counterpart terminal, and the IP address "1.1.1.2" of the management system 50 that has sent the preparatory relay request information.

At S62-1 and S62-2, the relay terminals 30a and 30b each cause the data transmit/receive 31 to send preparatory transmit request information to the request terminal 10aa through the communication network 2. The preparatory transmit request information requests the request terminal 10aa to send preparatory transmit information including the Packet Internet Grouper (PING) to each one of the relay terminals 30a and 30b before starting the videoconference. More specifically, the preparatory transmit request information includes the session ID "sel", and is transmitted with the IP addresses of the relay terminals 30a and 30b. With this preparatory transmit request information, the request terminal 10aa is able to know that the preparatory transmit information is to be sent during the session with the session ID "sel", as well as the IP addresses "1.2.1.2" and "1.2.2.2" of the relay terminals 30a and 30b.

As described above, the management system 50 does not directly send the IP address of the counterpart terminal 10db to the request terminal 10aa. Instead, as described above referring to S61-1 and S61-2, the management system 50 sends the IP address of the counterpart terminal 10db respectively to the relay terminal 30a and the relay terminal 30b. As described above referring to S62-1, the relay terminal 30aa requests the request terminal 10aa to send the preparatory transmit information to the relay terminal 30aa. In this manner, the management system 50 prevents the terminal 10 from obtaining the IP address of another terminal 10, thus improving the security.

At S63-1 and S63-2, the request terminal 10aa causes the data transmit/receive 11 to send the preparatory transmit information, respectively, to the relay terminals 30a and 30b through the communication network 2. The preparatory transmit information is sent to the counterpart terminal 10db through each one of the relay terminals 30a and 30b before data such as the image data and the voice data is transmitted. By sending the preparatory transmit information in replace of the image or voice data, the management system 50 is able to calculate a time period required for transmitting such data from the request terminal 10aa to the counterpart terminal 10db through each one of the relay terminals 30a and 30b. Further, the preparatory transmit information includes PING information used for checking whether the request terminal 10aa, the relay terminal 30a or 30b, and the counterpart terminal 10db are each connected to allow communication, the date and time of which the request terminal 10aa sends the preparatory transmit information, and the session ID "sel". With this preparatory transmit information, each of the relay terminals 30a and 30b knows that the preparatory transmit information is transmitted in the session with the session ID "sel", and the IP address "1.2.1.3" of the request terminal 10aa that has sent the preparatory transmit information.

At S64-1 and S64-2, the relay terminals 30a and 30b each transmit the preparatory transmit information to the counterpart terminal 10db having the IP address "1.3.2.4", which is obtained from the preparatory transmit information. With the preparatory transmit information, the counterpart terminal 10db is able to know that the preparatory transmit information is transmitted during the session with the session ID "sel", and the IP addresses "1.2.1.2" and "1.2.2.2" of the relay terminals 30a and 30b that respectively send the preparatory transmit information.

Referring to FIG. 21B, at S65, the secondary relay terminal selection unit 16 of the counterpart terminal 10db selects one of the relay terminals 30a and 30b to be used for videoconference, based on the preparatory transmit information.

Referring now to FIG. 5 and FIG. 22, operation of selecting the relay terminal 30 for videoconference, which is performed at S65 of FIG. 21B, is explained. At S65-1, the counter 16a of the secondary relay terminal selection unit 16 (FIG. 5) obtains the date and time at which the data transmit/receive 11 of the counterpart terminal 10db receives the preparatory transmits information for each one of the relay terminals 30a and 30b.

At S65-2, the calculator 16b calculates, for each one of the relay terminals 30a and 30b, a time period between the time when the preparatory transmit information is transmitted by the request terminal 10aa and the time when the preparatory transmit information is received by the counterpart terminal 10db. The date and time at which the preparatory information is transmitted by the request terminal 10aa is obtainable from the preparatory transmit information. The date and time of which the preparatory transmit information is received at the counterpart terminal 10db is obtained by the counter 16a.

At S65-3, the secondary selector 16c determines whether all items of preparatory transmit information is received for all of candidate relay terminals, during the session with the session ID "sel". In this example, the secondary selector 16c counts a total number of items of preparatory transmit information that have been received, and compares with the total number of candidate relay terminals 30 of "2". When it is determined that the preparatory transmit information has not been received for at least one relay terminal 30 ("NO" at S65-3), the operation proceeds to S65-4. When it is determined that the preparatory transmit information has been received for all of the candidate relay terminals 30 ("YES" at S65-3), the operation proceeds to S65-5.

At S65-4, the secondary selector 16c determines whether a predetermined time period passes after the preparatory transmit information is received at the counterpart terminal 10db. In this example, the predetermined time period is set to one minute. When it is determined that the predetermined time period has not passed ("NO" at S65-4), the operation returns to S65-1. When it is determined that the predetermined time period has passed ("YES" at S65-4), the operation proceeds to S65-5.

At S65-5, the secondary selector 16c selects one of the relay terminals 30, which has the least value of the time period required for transmitting the preparatory transmit information based on the calculation of the calculator 16b. In this example, it is assumed that the relay terminal 30a is selected as a time period for transmitting the preparatory transmit information that is relayed through the relay terminal 30a has a value less than the value of the time period for transmitting the preparatory transmit information that is relayed through the relay terminal 30b.

Referring back to FIG. 21B, at S66, the data transmit/receive 11 of the counterpart terminal 10db sends the relay terminal selection information to the management system 50 through the communication network 2. In this example, the relay terminal selection information indicates that the relay terminal 30a is selected. More specifically, the relay terminal selection information includes the session ID "sel", and the relay terminal ID "111a" of the selected relay terminal 30a, and is transmitted with the terminal IP address of the counterpart terminal 10db. With the relay terminal selection information, the management system 50 is able to know that the relay terminal 30a has been selected during the session with the session ID "sel", and the IP address "1.3.2.4" of the counterpart terminal 10db that has sent the relay terminal selection information.

At S67-1, the session manager 57 of the management system 50 stores, in the session management table of FIG. 12 stored in the session management DB 5005, the relay terminal ID "111a" of the relay terminal 30a, which is finally selected for communication, in the "relay terminal ID" field of a record provided for the session with the session ID "sel". At S67-21, the data transmit/receive 51 of the management system 50 sends the relay terminal ID "111a" and the IP address "1.3.2.4" of the counterpart terminal 10db to the request terminal 10aa.

At S68, the data transmit/receive 51 of the management system 50 sends the relay start request information to the relay terminal 30a through the communication network 2. The relay start request information requests the relay terminal 30a to start relay operation. More specifically, the relay start request information includes the IP address "1.2.1.3" of the request terminal 10aa, and the IP address "1.3.2.4" of the counterpart terminal 10db. At S69, the relay terminal 30a establishes four sessions between the request terminal 10aa and the counterpart terminal 10db including a session for transmission of low-level resolution image data, a session for transmission of medium-level resolution image data, a session for transmission of high-level resolution image data, and a session for transmission of voice data. Once these sessions are established, the request terminal 10aa is able to start videoconference with the counterpart terminal 10db.

In the above-described example, the communication management system 50 sends the relay terminal selection information to the counterpart terminal 10db at S47 (FIG. 18), and the counterpart terminal 10db performs operation of S48, S64-1 (FIG. 21A), S64-2 (FIG. 21B), and S65 (FIG. 21B) to select the relay terminal 30. In alternative to this example, the communication management system 50 may send the relay terminal selection information to the request terminal 10aa to cause the request terminal 10aa to perform selection of the relay terminal 30. In such case, the request terminal 10aa performs operation of S48, S64-1 (FIG. 21A), S64-2 (FIG. 21B), and S65 (FIG. 21B) in a substantially similar manner as described above. Further, at S66, the request terminal 10aa sends the relay terminal selection information to the communication management system 50. Alternatively, the counterpart terminal 10db may send information indicating a time period counted from the time when the preparatory transmit information is transmitted and the time when the preparatory transmit information is received to any one of the request terminal 10aa or the management system 50. Based on this information, the request terminal 10aa or the management system 50 may select one relay terminal 30a.

Referring now to FIG. 5 and FIG. 23, operation of transmitting and receiving data such as image data and voice data between the request terminal 10A and the counterpart terminal 10B to carry out videoconference, performed by the communication system 1, is explained according to an example embodiment of the present invention. In this example, the data such as the image data and the voice data flows in a direction from the request terminal 10aa to the counterpart terminal 10db, or in another direction from the counterpart terminal 10db to the request terminal 10aa. Since operation such as transmission and reception of the data or detection of delay time is the same for both of the directions, the following example focuses on communication in which data flows from the request terminal 10aa to the counterpart terminal 10db.

Referring to FIG. 23, at S81, the data transmit/receive 11 of the request terminal 10aa sends data to the relay terminal 30a through the communication network 2. The data includes image data such as image data of an object captured by the imaging unit 14a and voice data that is input through the sound input 15a. In this example, it is assumed that the high-quality image data based on the low-level resolution image data, the medium-level resolution image data, and the high-level resolution image data, and the voice data, are transmitted. Accordingly, the data transmit/receive 31 of the relay terminal 30a receives the image data of three different resolution levels, and the voice data.

At S82, the data quality checker 33 searches the data quality management DB 3001 (FIG. 7) using the IP addresses "1.3.2.4" of the counterpart terminal 10db as a key to obtain the quality of the image data to be transmitted to the relay terminal 30a. In this example, the quality of image data to be transmitted to the relay terminal 30a is the high-quality image data. Since the image data that is received at the data transmit/receive 31 has the quality that is the same as the quality of the image data obtained from the data quality management DB 3001, at S83, the relay terminal 30a sends the high-quality image data and the voice data to the counterpart terminal 10db, without applying further image processing. The counterpart terminal 10db receives the high quality image data that is generated based on the low-level resolution image data, medium-level resolution image data, and high-level resolution image data, and the voice data, at the data transmit/receive 11. The display control 14b combines the image data of three different resolution levels into the high quality image data for display onto the display 11. Further, the sound output 15b outputs the voice sound based on the voice data.

At S84, the delay detector 17 of the counterpart terminal 10db periodically detects a delay time indicating the time at which the image data is received at the data transmit/receive 11, for example, every one second. In this example, it is assumed that the delay time of 200 ms is obtained.

At S85, the data transmit/receive 11 of the counterpart terminal 10db sends the delay time information indicating the delay time of 200 ms to the communication management system 50 through the communication network 2. With the delay time information, the communication management system 50 is notified of the delay time, and the IP address "1.3.2.4" of the counterpart terminal 10db that has sent the delay time information.

At S86, the delay time manager 60 of the communication management system 50 searches the terminal management DB 5003 (FIG. 10) using the IP address "1.3.2.4" of the counterpart terminal 10db as a search key to extract the terminal ID "01db" of the counterpart terminal 10db. The delay time manager 60 stores the delay time of 200 ms obtained from the delay time information in a "delay time" field of the record of the terminal ID "01db" of the session management table stored in the session management DB 5005 (FIG. 12).

At S87, the quality determiner 58 searches the quality management DB 5007 (FIG. 15) using the delay time of 200 ms to extract the image data quality of "MEDIUM". Based on the extracted image data quality, the quality determiner 58 determines that the quality of image data suitable for the delay time of 200 ms is medium.

At S88, the data transmit/receive 51 searches the relay terminal management DB 5001 (FIG. 8) using the relay terminal ID "111a", which is stored in the session management DB (FIG. 12) in association with the counterpart terminal ID "01db", to extract the IP address "1.2.1.2" of the relay terminal 30a.

At S89, the data transmit/receive 51 sends the quality information indicating that the image data quality that has been determined at S87 is medium-level, to the relay terminal 30a through the communication network 2. The image quality information is transmitted with the IP address "1.3.2.4" of the counterpart terminal 10db, which was used as a search key at S86.

At S90, the change quality manager 34 of the relay terminal 30a stores the IP address "1.3.2.4" of the counterpart terminal 10db in association with the "medium-level" quality image data to be relayed by the counterpart terminal 10db, in the data quality management DB 3001 (FIG. 7).

At S91, the request terminal 10aa transmits the high quality image data including the low-level resolution image data, the medium-level resolution image data, and the high-level resolution image data, and the voice data, to the relay terminal 30a, in a substantially similar manner as described above referring to S81.

At S92, the data quality checker 33 of the relay terminal 30a searches the data quality management DB 3001 (FIG. 7) using the IP address "1.3.2.4" of the counterpart terminal 10db as a search key to extract the quality of the image data suitable for the counterpart terminal 10db, in a substantially similar manner as described above referring to S82.

At S93, since the image data quality that is stored for the counterpart terminal 10db is the medium-level, which is lower than the quality of the image data that is received at the data transmit/receive 31, the data quality changer 35 changes the quality of the image data from the high-level to the medium level. In this example, the quality of the voice data remains the same.

At S94, the data transmit/receive 31 of the relay terminal 30 sends the image data having the quality that is lowered to the medium-level, and the voice data, to the counterpart terminal 10db through the communication network 2. The data transmit/receive 11 of the counterpart terminal 10db receives the medium-quality image data that is generated based on the low-level resolution image data and the medium-level resolution image data, and the voice data. The display control 14b of the counterpart terminal 10db combines the image data of two different resolution levels to generate the medium-level image data for display on the display 100. Further, the sound output 15db outputs the voice sound generated based on the voice data. As described above, when any delay in receiving the image data at the counterpart terminal 10db is observed, the relay terminal 30a changes the quality of image data by lowering the quality of image data. Accordingly, the users participating the videoconference are able to carry out communication more smoothly.

Referring now to FIG. 26, operation of transmitting display data, which is displayed on the display 208a of the external input apparatus 40, to the counterpart communication terminal 10, performed by the communication terminal 10 is explained according to an example embodiment of the present invention. The operation of FIG. 26 is performed after the relay terminal 30 is selected. In this example, it is assumed that the communication terminal 10aa sends display data, which is displayed by the external input apparatus 40aa connected to the terminal 10aa, to the counterpart terminal 10db for display through the counterpart terminal 10db.

When the relay terminal 30 is selected, at S67-21 (FIGS. 21B and 26), the data transmit/receive 11 of the terminal 10aa receives the relay terminal ID "111a" of the relay terminal 30 and the IP address "1.3.2.4" of the terminal 10db, from the communication management system 50. At S67-22 (FIG. 26), the memory control 19 of the terminal 10aa stores the relay terminal ID "111a" and the IP address "1.3.2.4" of the terminal 10db in the memory 1000 as information regarding a current session.

When the external input apparatus 40aa and the terminal 10aa are connected with each other, at S70, the connection detector 42 of the external input apparatus 40aa detects such connection. When the connection detector 42 detects that the external input apparatus 40aa and the terminal 10aa are connected, at S71, the install determiner 43a determines whether the external input apparatus 40aa is provided with the display data obtainer 451, the display data transmit 452, and the resolution converter 453. More specifically, the install determiner 43a determines whether the external input apparatus 40aa is installed with programs or modules of the display data obtainer 1451, the display data transmit 1452, and the resolution converter 1453. When these programs or modules are installed, it is determined that the external input apparatus 40aa is provided with the corresponding functions of the display data obtainer 451, the display data transmit 452, and the resolution converter 453.

When the install determiner 43a determines that the external input apparatus 40aa does not have at least one of these modules or programs, at S72, the mount 48 mounts the at least one program that is missing from the memory 1000 of the communication terminal 10aa. At 73, the program obtainer 43b obtains the corresponding program such as the display data obtainer program 1451, the display data transmit program 1452, or the resolution converter program 1453 for installation onto the external input apparatus 40aa. With installation of the program that is missing, the external input apparatus 40aa now has the display data obtainer 451, the display data transmit 452, and the resolution converter 453.

When S73 is completed, at S74, the data transmit/receive 41 of the external input apparatus 40aa sends a request to the communication terminal 10aa, which asks for permission to execute the installed programs, that is, the display data obtainer 451, the display data transmit 452, and the resolution converter 453. At S75, when a response that permits execution is received from the communication terminal 10aa, the display data obtainer 451 obtains display data, which is generated based on a screen being displayed on the display 208a of the external input apparatus 40aa. At S76, the resolution converter 453 converts the resolution of the display data obtained by the display data obtainer 451 according to the resolution determined based on information regarding the resolution of the display 208a of the external input apparatus 40 and the resolution of the display 100 of the terminal 10aa. The display data transmit 452 transmits the display data having the converted resolution to the communication terminal 10aa. The communication terminal 10aa receives the display data through the external device transmit/receive 18.

Operation of converting the resolution of the display data, performed by the resolution converter 453, will be described below referring to FIG. 30. The resolution conversion performed by the external input apparatus 40 differs from the above-described resolution conversion performed based on the operation state of the relay terminal 30 and the communication speeds between the communication terminal 10 and the relay terminal 30. More specifically, the operation state of the relay terminal 30 and the communication speeds are irrelevant with resolution conversion performed by the resolution converter 454.

When the external data transmit/receive 18 of the communication terminal 10aa receives the display data, at S77, the memory control 19 of the communication terminal 10aa reads out the relay terminal ID "111a" and the IP address "1.3.2.4" of the counterpart terminal 10db from the memory 1000. At S78, the data transmit/receive 11 transmits the display data and the IP address "1.3.2.4" of the counterpart terminal 10db to the relay terminal 30 having the terminal ID "111a".

When the display data is received from the terminal 10aa at S78, at S79, the relay terminal 30 changes quality of the image data based on the IP address "1.3.2.4" of the counterpart terminal 10db. At S80, the terminal 10aa further sends the display data to the counterpart terminal 10db. More specifically, at S79, the relay terminal 30 changes quality of the image data or the voice data in a substantially similar manner as described above referring to S81 to S94 of FIG. 23.

When the display data is received from the relay terminal 30 at the data transmit/receive 11, at S81, the communication terminal 10db causes the display control 14b to display the obtained display data on the display 100. For example, referring to FIG. 28, the display control 14b displays an image that corresponds to the screen being displayed by the external input apparatus 10aa at the left sides of a screen. At the upper right side, the display control 14b displays an image based on the image data that is captured by the imaging unit 14a of the terminal 10aa and received from the data transmit/receive 11 of the terminal 10aa. At the lower right side, the display control 14b displays an image based on image data that is captured by the imaging unit 14a of the terminal 10db.

Referring now to FIGS. 24, 29, and 30, operation of converting the display data to be transmitted from the external input apparatus 40aa to the terminal 10aa, performed by the external input apparatus 40aa, is explained according to an example embodiment of the present invention.

As illustrated in FIG. 29, at S901, the data transmit/receive 41 of the external input apparatus 40aa sends a request for a resolution of the display 100 of the terminal 10aa to the communication terminal 10aa. At S902, the resolution obtainer 21a of the terminal 10aa obtains information regarding the resolution of the display 100 of the terminal 10aa from the resolution memory 1005. When the resolution obtainer 21a obtains information regarding the resolution of the display 100 of the terminal 10aa, at S903, the external data transmit/receive 18 sends the obtained information regarding the resolution of the display 100 of the terminal 10aa to the external input apparatus 40aa. When the data transmit/receive 41 of the external input apparatus 40aa receives information regarding the resolution of the display 100 of the terminal 10aa, at S904, the memory control 49 stores the resolution of the display 100 of the terminal 10aa in the resolution management table of the resolution management DB 4001.

At S905, the display data obtainer 451 of the external input apparatus 40aa obtains display data, which corresponds to a screen being displayed by the display control 47 on the display 208a. At S906, the resolution converter 453 of the external input apparatus 40aa obtains information regarding the resolution of the display 208a of the external input apparatus 40aa, and information regarding the resolution of the display 100 of the terminal 10aa from the resolution management DB 4001. At S907, the resolution converter 453 converts the display data obtained at S905, based on the resolution of the display 100 of the terminal 10aa and the resolution of the display 208a of the external input apparatus 40aa, to generate display data to be transmitted to the communication terminal 10aa.

Referring now to FIG. 30, operation of converting the resolution of the display data, performed by the resolution converter 453 at S907, is described. In this example, the vertical resolution and the horizontal resolution of the display 208a of the external input apparatus 40, which are obtained at S906, are respectively expressed as H40 and W40. Further, the vertical resolution and the horizontal resolution of the display 100 of the terminal 10aa, which are stored in the resolution management table of the resolution management DB 4001, are respectively expressed as H10 and W10. As described below, the resolution converter 453 converts the vertical resolution of the display data being displayed according to the vertical resolution H40 of the display 208a to a vertical resolution H' of the display data to be transmitted, and the horizontal resolution of the display data being displayed according to the horizontal resolution W40 of the display 208a to a horizontal resolution W' of the display data to be transmitted, based on relationship among the resolutions H40, W40, H10, and W10.

At S9071, the resolution converter 453 determines whether the input apparatus vertical resolution H40 is equal to or less than the terminal vertical resolution H10 (H40<=H10), and whether the input apparatus horizontal resolution W40 is equal to or less than the terminal horizontal resolution W10 (W40<=W10). When it is determined that H40 is equal to or less than the terminal horizontal resolution H10 (H40<=H10) and W40 is equal to or less than W10 (W40<=W10) ("YES" at S9071), the operation proceeds to S9072.

At S9072, the resolution converter 453 determines that the vertical resolution H' of the display data and the horizontal resolution W' of the display data are H40 and W40, respectively. More specifically, since the resolution of the external input apparatus 40 is equal to or less than the resolution of the terminal 10, the resolution of the display data to be transmitted is set to be equal to that of the external input apparatus 40. Thus, no conversion is performed, if the display data has the resolution specified by the display 208a of the resolution of the external input apparatus 40.

At S9071, when it is not determined that H40 is equal to or less than H10 (H40<=H10) and W40 is equal to or less than W10 (W40<=W10), which includes the case where H40 is greater than H10 (H40>H10) or W40 is greater than W10 (W40>W10) ("NO" at S9071), the operation proceeds to S9073. At S9073, the resolution converter 453 determines whether W40 is greater than W10 (W40>W10) and whether H40 is equal to or less than H10 (W40<=H10), or determines whether W40 is greater than W10 (W40>W10), whether H40 is greater than H10 (H40>H10), and whether H10 is equal to or greater than W10 (H10>=W10).

When it is determined that W40 is greater than W10 and H40 is equal to or less than H10, or W40 is greater than W10, H40 is greater than H10, and H10 is equal to or greater than W10 ("YES" at S9073), the operation proceeds to S9074. At S9074, the resolution converter 453 determines that the horizontal resolution W' of the display data is set to W10, and the vertical resolution H' of the display data is set to W10*H40/W40. The resolution converter 453 converts the resolutions H40 and W40 of the display data to the resolutions H'=W10*H40/W40, and to W'=W10.

When it is not determined that W40 is greater than W10 and H40 is equal to or less than H10, or W40 is greater than W10, H40 is greater than H10, and H10 is equal to or greater than W10 ("NO" at S9073), which includes the case where W40 is equal to or less than W10 and H40 is greater than H10, or W40 is greater than W10, H40 is greater than H10, and H10 is less than W10 ("NO" at S9073), the operation proceeds to S9075. At S9075, the resolution converter 453 determines that the horizontal resolution W' of the display data is set to H10*W40/H40, and the vertical resolution H' of the display data is set to H10. The resolution converter 453 converts the resolutions of the display data to be the determined values.

More specifically, it is not determined that W40>W10, H40>H10, and H10>=W10 at S9073 ("NO" at S9073), when the vertical resolution H10 of the display 100 of the terminal 10 is less than the vertical resolution H40 of the display 208a of the external input apparatus 40, and the horizontal resolution W40 of the display 208a of the external input apparatus 40 is equal to or less than the horizontal resolution W10 of the display 100 of the communication terminal 10, that is, H40>H10 and W40<=W10.

Alternatively, it is not determined that W40>W10, H40>H10, and H10>=W10 at S9073 ("NO" at S9073), when the vertical and horizontal resolutions of the display 100 of the communication terminal 10 are lower than the vertical and horizontal resolutions of the display 208a of the external input apparatus 40, respectively, and the vertical resolution of the display 100 of the terminal 10 is lower than the horizontal resolution of the display 100 of the terminal 10, that is, W40>W10, H40>H10, and H10<W10.

As described above referring to FIG. 30, through performing S907, the resolution converter 453 determines that the vertical resolution of the display data is set equal to the vertical resolution of the display 100 of the terminal 10, when the vertical resolution of the display 100 of the terminal 10 is lower than the vertical resolution of the display 208a of the input apparatus 40. Once the vertical resolution of the display data is determined, the resolution converter 453 sets the horizontal resolution of the display data such that the height-to-width aspect ratio of the display data is equal to the height-to-width aspect ratio of the display 100 of the terminal 10.

Further, when the horizontal resolution of the display 100 of the terminal 10 is lower than the horizontal resolution of the display 208a of the input apparatus 40, the resolution converter 453 determines that the horizontal resolution of the display data is set equal to the horizontal resolution of the display 100 of the terminal 10. Once the horizontal resolution of the display data is determined, the resolution converter 453 sets the vertical resolution of the display data such that the height-to-width aspect ratio of the display data is equal to the height-to-width aspect ratio of the display 100 of the terminal 10.

In this manner, the resolution converter 453 converts the resolution of the display data of an image that is displayed onto the display 208a, to a resolution determined as described above to generate display data to be transmitted to the communication terminal 10.

Referring back to FIG. 30, when the resolution of the display data is converted by the resolution converter 453, at S908, the display data transmit 452 transmits the display data having the converted resolution to the terminal 10aa.

When the external data transmit/receive 18 of the terminal 10aa receives the display data from the external input apparatus 40aa at S908, at S909, the display control 14b renders the display data for display onto the display 100. At S910, the image data obtainer 14c obtains the image data that is displayed onto the display 100 at S909. At S911, the data transmit/receive 11 sends the image data obtained by the image data obtainer 14c to the relay terminal 30. For example, the image data being displayed onto the display 100 includes an image of the display data received from the external input apparatus 40aa, and an image of the user at the terminal 10aa.

Further, when the resolution change detector 21b detects the change in resolution at S912, at S913, the resolution obtainer 21a obtains information regarding the updated resolution of the terminal 10aa. For example, the user may input information regarding a resolution of the display 100 of the terminal 10aa through the operation input 12 (FIG. 5A), which may be implemented by the operation button 108 (FIG. 3). In response to the user input, the resolution change detector 21b may change the resolution of the display 100 of the terminal 10aa. In another example, the resolution change detector 21b detects the change in resolution when the terminal 10aa is connected to a new display 100 having a resolution different from that of the display 100 that is previously connected to the terminal 10aa.

At S913, the resolution obtainer 21a may store the updated resolution of the display 100, in the resolution memory 1005. At S914, the external data transmit/receive 18 sends information regarding the updated resolution to the external input apparatus 40aa. At S915, information regarding the updated resolution is stored in the resolution management DB 4001.

As described above, in this example, the terminal 10 sends information regarding the resolution of the display of the terminal 10, to the external input apparatus 40. Based on this information, the external input apparatus 40 compares between the resolution of the display of the terminal 10 and the resolution of the display of the external input apparatus 40. The external input apparatus 40 transmits display data having a resolution, which reflects the comparison result, to the communication terminal 10. Since the resolution of the display data is adjusted before it is transmitted to the communication terminal 10, transmission of the display data that is unnecessarily high in resolution can be suppressed. This reduces the loads on the communication terminal 10 as the communication terminal 10 does not have to perform resolution conversion on the display data that is received from the external input apparatus 40 having the display with a different resolution, before displaying the display data onto the display 100 of the communication terminal 10.

Further, since conversion is performed at the external input apparatus 40 before the external input apparatus 40 sends display data, transmission of the display data having a data size that is unnecessarily large is suppressed.

Further, the terminal 10 stores, in the memory 1000, address information such as the relay terminal ID of the relay terminal 30 that transmits image data or voice data or information regarding the counterpart terminal 40. Using the address information, the terminal 10 is able to transmit the display data that reflects the screen being displayed by the external input apparatus 40 to the counterpart terminal 10 through the relay terminal 30, even when the external input apparatus 40 is not managed by the management system 50. The display data being transmitted may be presentation data that is stored in the memory 4000 of the external input apparatus 40. Since the management system 50 does not have to authenticate the external input apparatus 40, the workload otherwise required for the management system 50 to authenticate the external input apparatus 40 is reduced.

In case when the user wants to share the screen being displayed by the external input apparatus 40 with other users, the external input apparatus 40 does not have to be previously installed with various modules such as the display data obtainer 451 and the display data transmit 452. As long as the external input apparatus 40 is connected to the communication terminal 10, various modules or programs such as the display data obtainer program 1451 and the display data transmit 1452 program are automatically downloaded onto the external input apparatus 40. With this installation, the external input apparatus 40 is caused to have the functions such as the display data obtainer 451, the display data transmit 452, and the resolution converter 453. Since the external input apparatus 40 is able to transmit the display data having the converted resolution to the communication terminal 10, the image being displayed by the external input apparatus 40 can be shared among the users of the communication system 1 through the communication terminal 10.

In the above-described example, the terminal 10 that is connected to the external input apparatus 40 displays the display data received from the external input apparatus 40 onto the display 100 of the terminal 10. The terminal 10 further transmits the display data to the counterpart terminal 10 for display onto the display 100 of the counterpart terminal 10. Before transmitting the display data to the counterpart terminal 10, the terminal 10 may convert a resolution of the display data to be transmitted, for example, in case the display of the counterpart terminal 10 has a resolution different from that of the display 100 of the communication terminal 10.

Further, as described above, the communication system 1 is provided with a function of selecting one of a plurality of relay terminals 30 that is suitable for communication between a request terminal 10 and a counterpart terminal 10. While information regarding the local network environment such as the IP address of the relay terminal 30 may be obtainable, it may be difficult to obtain information regarding the entire network such as the Internet. Based on information that is available from the communication network, the management system 50 selects a small number of relay terminals 30 out of a large number of relay terminals 30 for further processing. Preferably, the small number of relay terminals 30 is equal to or more than two. Before sending contents data such as image data and voice data from the request terminal 10 to the counterpart terminal 10, the management system 50 causes the request terminal 10 to send preparatory transmit information to the counterpart terminal 10 via each one of the selected relay terminals 30 to obtain information regarding a time required for transmitting the preparatory transmit information for each one of the selected relay terminals 30. Based on this obtained information, the relay terminal 30 that is most suitable for communication between the request terminal 10 and the counterpart terminal 10 is selected.

In one example, the management system 50 selects a small number of relay terminals 30 each having the IP address that is similar to at least one of the IP address of the request terminal and the IP address of the counterpart terminal. Once the relay terminals 30 are selected, the management system 50 causes the request terminal 10 to send preparatory transmit information to the counterpart terminal 10 via each one of the selected relay terminals 30 to obtain a time required for transmitting the preparatory transmit information for each one of the selected relay terminals 30. The relay terminal 30 with a smallest value of the time for transmitting the preparatory transmit information is selected. Since the relay terminal 30 is selected based on information obtained using the actual communication network, the request terminal and the counterpart terminal are able to exchange high-quality image data and voice data with relatively high transmission speeds.

Additionally or alternatively, in order to select a small number of relay terminals 30, the maximum data transmission speed of the relay terminal 30 may be taken into account. Since the relay terminal 30 is selected based on information obtained using the actual communication network, the request terminal 10 and the counterpart terminal 10 are able to exchange high-quality image data and voice data with relatively high transmission speeds.

Additionally or alternatively, in order to select a small number of relay terminals 30, whether the relay terminal 30 is in the on-line state or not may be taken into account. Since the relay terminal 30 is selected based on the current operation state of the relay terminal 30, the relay terminal 30 is selected while considering current network environments of the network 2.

In the above-described example, any one of the display data obtainer 451, the display data transmit 452, and the resolution converter 453, which are stored in the memory 1000 of the terminal 10, may be previously installed onto the external input apparatus 40. In such case, installation of such programs does not have to be performed, thus reducing the workload of the terminal 10 and the external input apparatus 40 after they are connected.

In the above-described example, the communication terminal 10, the relay terminal 30, and the communication management system 50 are connected through the communication network 2 that includes the Internet. Alternatively, the communication terminal 10, the relay terminal 30, and the communication management system 50 may be located within a local network such that they may communicate with one another within the local network.

The management system 50 and the program providing system 90 may be each implemented by a single computer. Alternatively, any number of parts, functions, or modules of the management system 50 and the program providing system 90 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

A recording medium storing any one of the terminal control program, relay control program, and communication management program, or a storage device such as the HDD 204 that stores any one of the terminal control program, relay control program, and communication management program, or the program providing system 90 provided with the HD 204 storing any one of the terminal control program, relay control program, and communication management program, may be distributed within the country or to another country as a computer program product.

In the above-described examples, the quality of image data to be processed by the relay terminal 30, which is determined based on information obtainable from any one of the data quality management table of FIG. 7 and the quality management table of FIG. 15 is analyzed in terms of image resolution. Alternatively, any other criteria may be used to analyze quality of image data including, for example, depth of image, sampling frequency in case of voice data, and bit length in case of voice data.

Further, the date and time information stored in the relay terminal management table of FIG. 8 or the terminal management table of FIG. 10, or the delay time information stored in the session management table of FIG. 12, is expressed in terms of date and time. Alternatively, the date and time information or the delay time information may be expressed only in terms of time such as the time at which information is received.

Further, in the above-described examples, the relay terminal IP address of the relay terminal 30 and the terminal IP address of the terminal 10 are respectively managed using the relay terminal management table of FIG. 8 and the terminal management table of FIG. 10. Alternatively, the relay terminal 30 and the terminal 10 may each be managed using any other identification information or using any other tables. For example, when the relay terminal 30 or the terminal 10 needs to be identified on the communication network 2, the relay terminal 30 or the terminal 10 may be managed using Fully Qualified Domain Name (FQDN). In such case, the transmission system 10 is provided with a domain name system (DNS)

server that obtains the IP address that corresponds to the FQDN of the relay terminal 30 or the terminal 10. In view of this, identification information for identifying the relay terminal 30 on the communication network 2 may not only include the identification information that identifies the relay terminal 30 on the communication network 2, but also identification information that identifies a node on the communication network 2 to which the relay terminal 30 is connected, or identification information that identifies a node on the communication network 2 from which the relay terminal 3. Similarly, identification information for identifying the terminal 10 on the communication network 2 may not only include the identification information that identifies the terminal 10 on the communication network 2, but also identification information that identifies a node on the communication network 2 to which the terminal 10 is connected, or identification information that identifies a node on the communication network 2 from which the terminal 10 is connected.

In the above-described examples, the communication system 1 of FIG. 1 is treated as a videoconference system. Alternatively, the communication system 1 of FIG. 1 may be implemented as a teleconference system such as the IP teleconference system or the Internet teleconference system. Alternatively, the communication system 1 of FIG. 1 may be implemented as a car navigation system. In such case, the communication terminal 10 may be implemented as a car navigation system installed onto the automobile. The counterpart terminal 10 may be implemented as a management terminal or server at a management center that manages the car navigation system or a car navigation system that is installed onto another automobile.

Further, the display data to be obtained does not have to be the entire screen being displayed by the external input apparatus 40. For example, only a portion of the screen being displayed by the external input apparatus 40 may be obtained as display data. FIG. 27 illustrates an example screen displayed by the external input apparatus 40. In FIG. 27, the screen includes a window area (a) and a window area (b). The user may select the window area (a) to be shared with the user at the counterpart communication terminal 10 by a pointer (c), using the mouse 212 (FIG. 4). The display data obtainer 451 of the external input apparatus 40 obtains the display data that is displayed in the window area (a), which is specified by the pointer (c).

Further, in the above-described example, the external input apparatus 40 displays the display data on the display 208. The display 208 may be incorporated in the external input apparatus 40 or provided separately from the external input apparatus 40.

In one example, the present invention may reside in: an external input apparatus, which transmits display data to a communication terminal that communicates with a counterpart communication terminal. The external input apparatus includes: resolution data receiving means for receiving first resolution data specifying a resolution of a display of the communication terminal from the communication terminal; converting means for converting a resolution of the display data based on the first resolution data received by the resolution data receiving means and first resolution data specifying a resolution of a display of the external input apparatus; and display data transmitting means for sending the display data having the resolution converted by the resolution converting means, the display data being further transmitted by the communication terminal to the counterpart communication terminal.

In the above-described example, when a vertical resolution of the second resolution data is equal to or less than a vertical resolution of the first resolution data, and a horizontal resolution of the second resolution data is equal to or less than a horizontal resolution of the first resolution data, the resolution of the display data is set to the resolution of the second resolution data.

When the vertical resolution of the second resolution data is greater than the vertical resolution of the first resolution data, and the horizontal resolution of the second resolution data is less than the horizontal resolution of the first resolution data, the vertical resolution of the display data is converted to the vertical resolution of the first resolution data.

When the vertical resolution of the second resolution data is greater than the vertical resolution of the first resolution data (H10<H40), and the horizontal resolution of the second resolution data is equal to or less than the horizontal resolution of the first resolution data (W40<=W10), the vertical resolution of the display data is converted to the vertical resolution of the first resolution data (H'=H10). Alternatively, when the horizontal resolution of the second resolution data is greater than the horizontal resolution of the first resolution data (W40>W10), the vertical resolution of the second resolution data is greater than the vertical resolution of the first resolution data (H40>H10), and the vertical resolution of the first resolution data is less than the horizontal resolution of the first resolution data (H10<W10), the vertical resolution of the display data is converted to the vertical resolution of the first resolution data (H'=H10).

When the horizontal resolution of the second resolution data is greater than the horizontal resolution of the first resolution data (W40>W10), the vertical resolution of the second resolution data is greater than the vertical resolution of the first resolution data (H40>H10), and the vertical resolution of the first resolution data is equal to or greater than the horizontal resolution of the first resolution data (H10>=W10), the horizontal resolution of the display data is converted to the horizontal resolution of the first resolution data (W'=W10). Alternatively, when the horizontal resolution of the second resolution data is greater than the horizontal resolution of the first resolution data (W40>W10), and the vertical resolution of the first resolution data is equal to or greater than the horizontal resolution of the first resolution data (H40<=H10), the horizontal resolution of the display data is converted to the horizontal resolution of the first resolution data (W'=W10).

In one example, the present invention may reside in a communication system including the external input apparatus and a communication terminal that receives the display data from the external input apparatus. The communication terminal includes: resolution data transmitting means for transmitting the first resolution data specifying the resolution of the display of the communication terminal to the external input apparatus; display data receiving means for receiving the display data transmitted from the external input apparatus; and display control means for displaying an image based on the display data received by the display data receiving means.

In one example, the present invention may reside in: a recording medium storing a plurality of instructions, which, when executed by the external input apparatus, cause the external input apparatus to perform a method of: receiving first resolution data specifying a resolution of a display of a communication terminal from the communication terminal; converting a resolution of display data based on the first resolution data and second resolution data specifying a resolution of a display of the external input apparatus; and transmitting the display data having the converted resolution to the communication terminal, the display data being further transmitted from the communication terminal to a counterpart transmission terminal.

Further, the external input apparatus 40 of the above-described examples may be referred to as a data providing apparatus that transmits display data processed by the data providing apparatus to the communication terminal 10 when the data providing apparatus is connected to the communication terminal 10.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in: a non-transitory computer recording medium storing a plurality of instructions which, when connection is detected between a communication terminal and a data providing apparatus, cause a processor of the data providing apparatus to perform: sending a request to the communication terminal to send first resolution data specifying a resolution of a display of the communication terminal; obtaining second resolution data specifying a resolution of a display of the data providing apparatus; converting a resolution of the display data to have a resolution determined based on the first resolution data and the second resolution data; and transmitting the display data having the converted resolution from the data providing apparatus to the communication terminal through the network.

What is claimed is:

1. A communication system, comprising:
   a communication terminal provided with a display that displays image data processed by the communication terminal; and
   a data providing apparatus provided with a display that displays display data processed by the data providing apparatus and configured to transmit the display data to the communication terminal when the data providing apparatus is connected to the communication terminal through a network, wherein the data providing apparatus includes:
      a network interface to receive first resolution data specifying a resolution of the display of the communication terminal from the communication terminal through the network; and
      a processor to:
         obtain second resolution data specifying a resolution of the display of the data providing apparatus;
         convert a resolution of the display data to a resolution determined based on the first resolution data and the second resolution data; and
         cause the network interface to transmit the display data having the converted resolution to the communication terminal through the network.

2. The communication system of claim 1, wherein a vertical resolution of the display data is converted to a vertical resolution of the first resolution data,
   when the vertical resolution of the second resolution data is greater than the vertical resolution of the first resolution data, and the horizontal resolution of the second resolution data is equal to or less than the horizontal resolution of the first resolution data, or
   when the horizontal resolution of the second resolution data is greater than the horizontal resolution of the first resolution data, the vertical resolution of the second resolution data is greater than the vertical resolution of the first resolution data, and the vertical resolution of the first resolution data is less than the horizontal resolution of the first resolution data.

3. The communication system of claim 2, wherein a horizontal resolution of the display data is converted to the horizontal resolution of the first resolution data,
   when the horizontal resolution of the second resolution data is greater than the horizontal resolution of the first resolution data, and the vertical resolution of the second resolution data is equal to or less than the vertical resolution of the first resolution data, or
   when the horizontal resolution of the second resolution data is greater than the horizontal resolution of the first resolution data, the vertical resolution of the second resolution data is greater than the vertical resolution of the first resolution data, and the vertical resolution of the first resolution data is equal to or greater than the horizontal resolution of the first resolution data.

4. The communication system of claim 3, wherein the vertical resolution and the horizontal resolution of the display data are determined to be equal to the vertical resolution and the horizontal resolution of the second resolution data, respectively,
   when the vertical resolution of the second resolution data is equal to or less than the vertical resolution of the first resolution data, and the horizontal resolution of the second resolution data is equal to or less than the horizontal resolution of the first resolution data.

5. The communication system of claim 1, wherein the communication terminal includes:
   a network interface to send the display data received from the data providing apparatus to a counterpart communication terminal to cause the counterpart communication terminal to display the display data on a display.

6. A communication terminal, comprising:
   a display control to cause a display of the communication terminal to display image data processed by the communication terminal;
   a network interface to receive display data to be transmitted to a counterpart communication terminal from a data providing apparatus when the data providing apparatus is connected to the communication terminal through a network;

a processor to:
   send first resolution data specifying a resolution of the display of the communication terminal to the data providing apparatus through the network; and
   receive the display data to be transmitted to the counterpart communication terminal from the data providing apparatus, the display data having a resolution converted by the data providing apparatus based on the first resolution data; and a memory to store a plurality of instructions which cause, when the data providing apparatus is connected to the communication terminal, the data providing apparatus to:
   obtain second resolution data specifying a resolution of the display of the data providing apparatus;
   convert a resolution of the display data to a resolution determined based on the first resolution data and the second resolution data; and
   cause the network interface to transmit the display data having the converted resolution to the communication terminal through the network.

7. A communication method, comprising:
displaying image data processed by a communication terminal onto a display of the communication terminal;
displaying display data processed by a data providing apparatus onto a display of the data providing apparatus;
detecting connection between the communication terminal and the data providing apparatus through a network, and when connection is detected, further performing:
transmitting first resolution data specifying a resolution of the display of the communication terminal from the communication terminal to the data providing apparatus;
obtaining at the data providing apparatus second resolution data specifying a resolution of the display of the data providing apparatus;
converting at the data providing apparatus a resolution of the display data to a resolution determined based on the first resolution data and the second resolution data; and
transmitting the display data having the converted resolution from the data providing apparatus to the communication terminal through the network.

8. The method of claim 7, wherein the converting converts a vertical resolution of the display data to a vertical resolution of the first resolution data,
   when the vertical resolution of the second resolution data is greater than the vertical resolution of the first resolution data, and the horizontal resolution of the second resolution data is equal to or less than the horizontal resolution of the first resolution data, or
   when the horizontal resolution of the second resolution data is greater than the horizontal resolution of the first resolution data, the vertical resolution of the second resolution data is greater than the vertical resolution of the first resolution data, and the vertical resolution of the first resolution data is less than the horizontal resolution of the first resolution data.

9. The method of claim 8, wherein the converting converts a horizontal resolution of the display data to the horizontal resolution of the first resolution data,
   when the horizontal resolution of the second resolution data is greater than the horizontal resolution of the first resolution data, and the vertical resolution of the second resolution data is equal to or less than the vertical resolution of the first resolution data, or
   when the horizontal resolution of the second resolution data is greater than the horizontal resolution of the first resolution data, the vertical resolution of the second resolution data is greater than the vertical resolution of the first resolution data, and the vertical resolution of the first resolution data is equal to or greater than the horizontal resolution of the first resolution data.

10. The method of claim 9, wherein the converting determines the vertical resolution and the horizontal resolution of the display data to be equal to the vertical resolution and the horizontal resolution of the second resolution data, respectively,
   when the vertical resolution of the second resolution data is equal to or less than the vertical resolution of the first resolution data, and the horizontal resolution of the second resolution data is equal to or less than the horizontal resolution of the first resolution data.

* * * * *